United States Patent Office 3,529,293
Patented Sept. 15, 1970

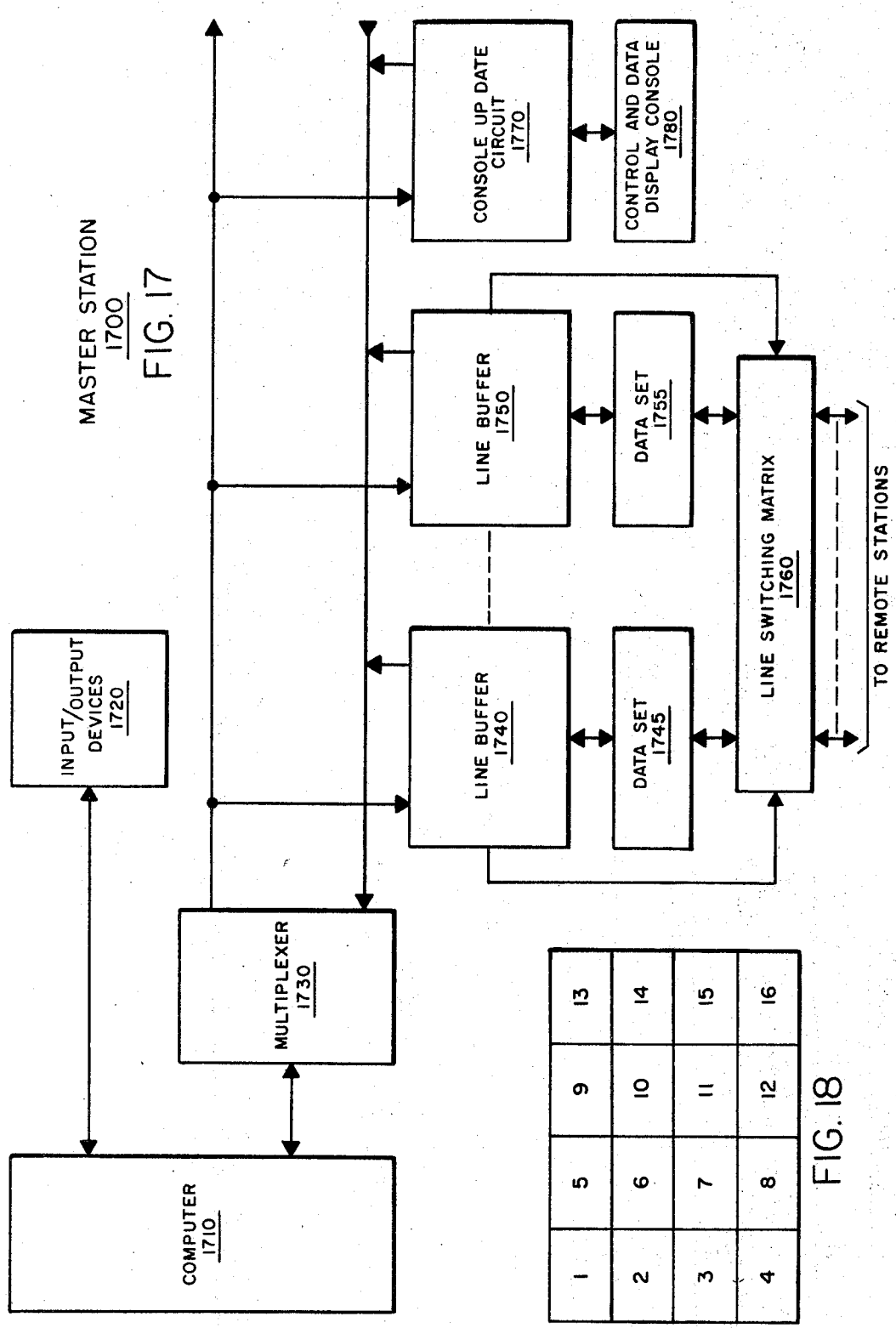

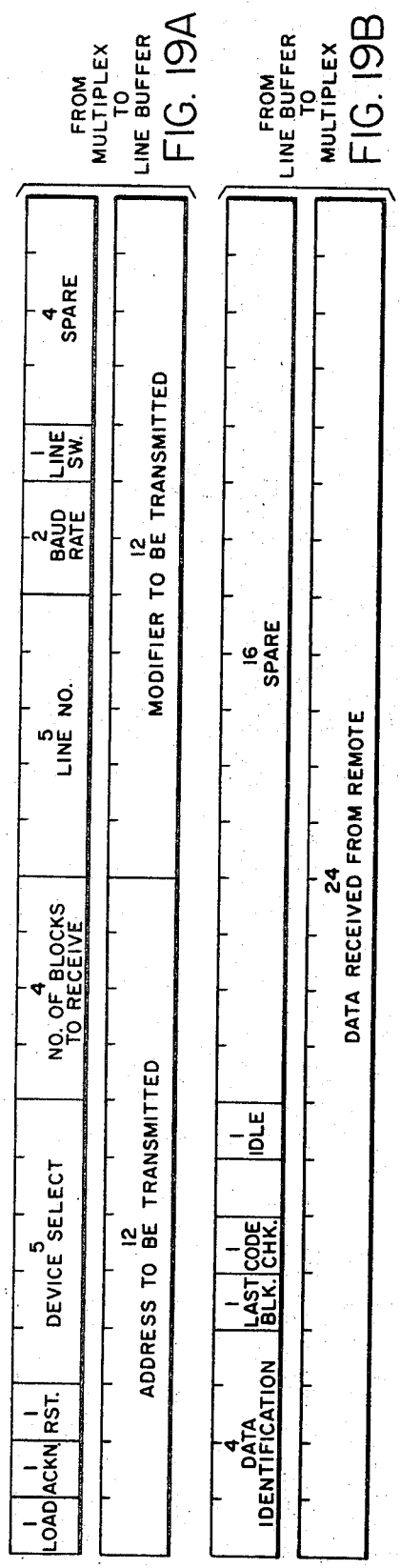

3,529,293
SUPERVISORY AND CONTROL SYSTEM
Joseph F. Sullivan, Lombard, Ronald E. Schauer, Chicago, Richard P. Sanders, Lisle, Bruno A. Mattedi, Villa Park, and Neil B. Johnson, St. Charles, Ill., assignors, by mesne assignments, to Leeds & Northrup Company, Philadelphia, Pa., a corporation of Pennsylvania
Filed Apr. 10, 1967, Ser. No. 629,708
Int. Cl. H04q 5/00
U.S. Cl. 340—163                    25 Claims

ABSTRACT OF THE DISCLOSURE

A system employing a digital computer, to periodically scan a number of remotely located devices in accordance with a predetermined scan program, and report the status of same to a central location. Dispatcher controlled apparatus at the central location interrupts the predetermined scan program to cause the computer to control selected remotely located devices in accordance with a control program.

BACKGROUND OF THE INVENTION

Field of invention

The present invention relates to electrical communications systems for the handling of intelligence both for the derivation of information and performance of control functions. Specifically, the present system is a computer controlled facility for the selective telemetering of information relative to the status of a plurality of remotely located devices, and for the selective control of a plurality of remotely located devices in a plurality of manners. Communication links employed in the present system are utilized on a non-dedicated basis.

Description of prior art

Continuous scan high speed supervisory and control systems consisting of a centrally located master station and a group of remote stations are well known. In a system of this sort the master station typically performs system scans, control instructions, displays system data, records certain data, and detects alarm conditions. Two such supervisory and control systems are disclosed in the copending U.S. patent applications of Bernard W. Bishop et al., Ser. No. 270,312, filed Apr. 3, 1963 and of David M. Arkin et al., Ser. No. 548,745, filed May 9, 1966, and assigned the assignee of this application.

Systems like those mentioned above employ a wired program master station, wherein the scan sequence is on a hard wired basis. This technique places certain limitations on the master station capabilities. Of primary concern is that any modifications to the scan sequence require an extensive rewiring of the master station. Particularly if the amount of data to be returned increases, the cost of such rewiring may be so high as to render a change or enlargement of the system economically unpractical.

SUMMARY OF THE INVENTION

This invention pertains to a supervisory and control system master station providing means for selecting and operating control equipment at a distant point and reporting back to the master station an indication of the status of such control equipment. In addition, it further includes facilities for automatic scanning and reporting of the status of devices located remote to the master station. The system according to the present invention utilizes a digital computer to perform the complex functions that are difficult or impossible for a wired master station to perform. Among the advantages of this system are generation of scan routines with scan portions of the system at different rates, as well as the processing of raw data received from the field, before displaying it according to system equations. Major and minor operational revisions of the system without the need for extensive system down time are accomplished by inclusion of the digital computer.

BRIEF DESCRIPTION OF THE DRAWINGS

FIGS. 1-16 comprise a diagram showing the equipment located in a supervisory and control system master station in accordance with the present invention wherein:

FIGS. 1-4 comprise a diagram of a multiplexer for use in the subject invention;

FIGS. 5-8 and portions of FIGS. 9-11 comprise a diagram showing a line buffer and associated equipment in accordance with the present invention;

Figure 1:
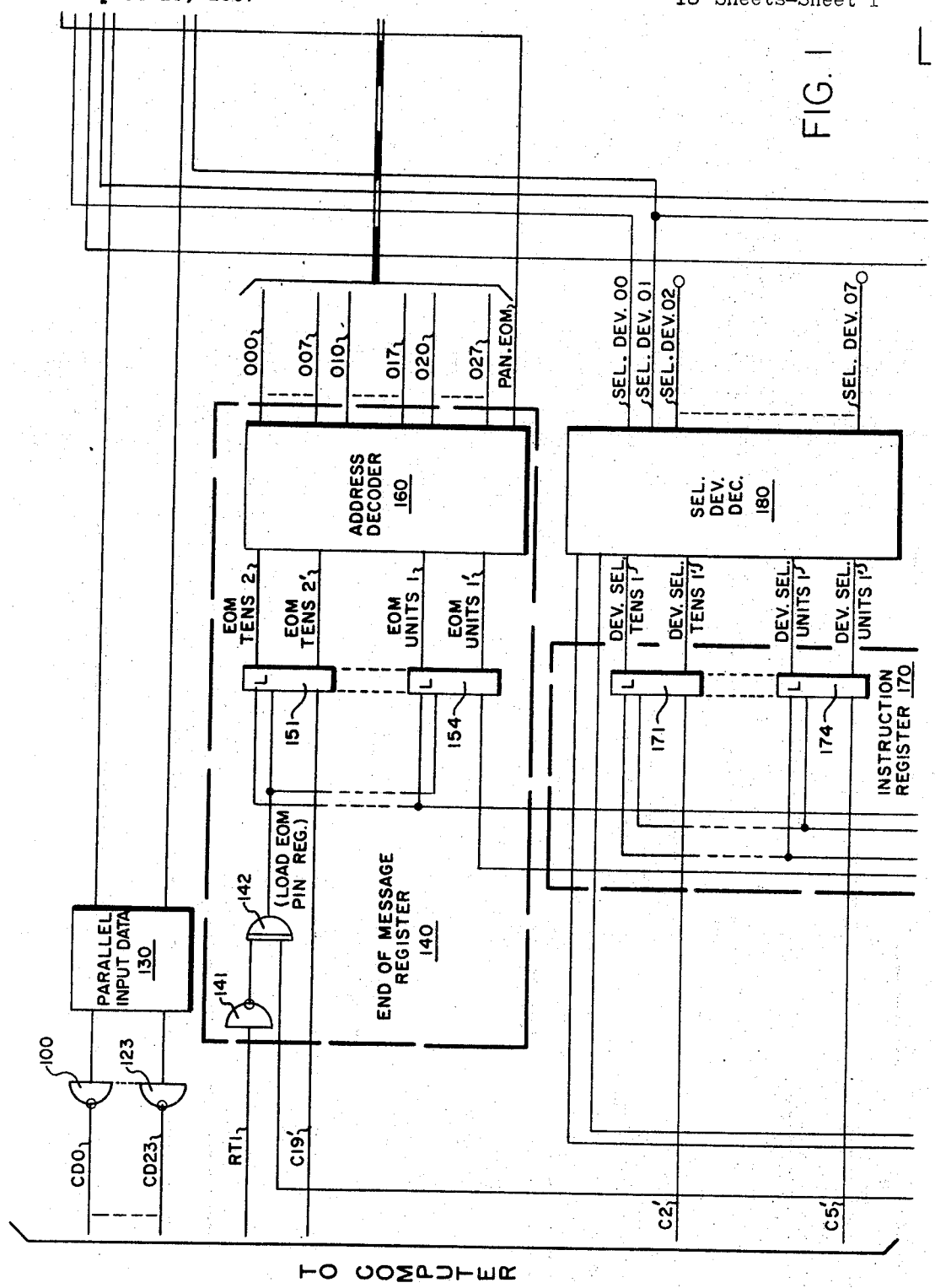

Portions of FIGS. 9-11 and FIG. 12 comprise a diagram of a console update circuit in accordance with the present invention;

FIGS. 13-16 comprise a diagram of a dispatcher's console and associated relay equipment in accordance with the present invention;

FIG. 17 is a block diagram showing the equipment located in a master station for use in the above-mentioned system;

FIG. 18 shows the manner in which FIGS. 1-16 are to be arranged; and

FIGS. 19-21 are diagrams of the message structures utilized in the instant system.

DESCRIPTION OF THE PREFERRED EMBODIMENT

The master station according to the present invention normally operates under direct control of a computer. In the present invention the utilization of a model SDS920 computer manufactured by Scientific Data Systems Incorporated has been found satisfactory. However, this invention is not limited to the use of this particular computer, but, rather, may be operated with any computer with similar capabilities.

The master station is adapted to carry on conversations with several remote stations simultaneously. Each remote would be on a separate line and each conversation could take place at a different speed ranging from 15 to 2400 bits per second. While not shown in the detailed disclosure of this invention, a number of time-shared displays and control consoles may be accommodated so as to permit display of large amounts of data. By use of several consoles the user may divide the system into several sub-systems with a dispatcher controlling each sub-system.

FIG. 17 is a block diagram of a supervisory and control system in accordance with the present invention. It is composed of a suitable computer complex 1710, a multiplexer 1730, a plurality of line buffers 1740 and 1750, each with their associated data set, line switching circuitry 1760, a console update circuit 1770 and a dispatcher console 1780. Also shown are communication facilities for connection to a plurality of remote stations which may be similar to those described in the copending application of D. M. Arkin et al., referenced above.

The multiplexer portion 1730 is the only common circuit in the master station 1700 in accordance with the present invention. It is a buffering network which provides a suitable interface with the computer complex.

The line buffers 1740 and 1750 perform all communication between the master station and remote stations. Each line buffer is responsible for generating and checking the error detection code for each message transmitted or received, and transferring the data received and results of error tests to the computer 1710. The computer can connect the line buffer to any one of a plurality of lines via the line switching matrix 1760 and direct it to transmit at different speeds. Malfunctioning line buffers may be retired from service and their work load assigned to remaining line buffers, thus maintaining system integrity with only reduction of the system scan rate.

The console update circuit 1770 provides for buffer storage of data received from the computer, processing of any dispatcher initiated instructions and interruption of the computer whenever an updating task has been completed or the dispatcher initiates a control. In storing data received from the computer the information is buffer stored thus relieving the computer of a time consuming chore. Data is then transferred to the designated storage device.

The present system has two basic modes of operation: supervisory (including telemetering) and control. The system is ordinarily in the supervisory (or telemetering) mode of operation, and is taken into the control mode when a command is to be executed.

During the supervisory mode, the system continuously interrogates remote stations for telemetered data, changes of status, alarms, etc. It should be realized that there may be more than one scan within a routine (alarms, digital data, etc.). The sequence of scanning within a routine, as well as how often each routine is executed, is under program control.

A variable length message is employed in retrieving data from remote stations. Each scan address is capable of causing the remote station to transmit as many as eight blocks of information. Each block consists of two 12-bit information sections (plus two bits used internally) and a 5-bit message security section as shown in FIG. 21. The scan address is always returned to the master station as the first section of the returned message. Each address can then cause as many as fifteen analog signals or one hundred eighty binary inputs (alarms, status indicators, etc.) or combinations thereof to be returned to the master station.

The second mode of operation is control. Control functions are accomplished by momentarily interrupting the supervisory scanning program to transmit the command sequence. The sequence is the same for all commands and is as follows:

The operator selects the command to be initiated for a particular device in the system. The computer converts the operator's request into a discrete 26-bit configuration (address and modifier) which is transmitted to the remote in question. The remote stores this comamnd and also transmits it back to the master station. The computer then performs a bit-by-bit comparison of the message that was transmitted to the remote and the message received from the remote. If the messages ar identical, the computer will cause transmission of an execute address (a discrete execute address is assigned to each remote). The remote station will, upon receiving this execute address, perform the control function requested by the operator. Should this sequence be broken, the computer and remote will abort the sequence and then respeat the control sequence from the start (retransmit the address and modifier). Upon completion of the control function, the system will revert to the supervisory mode.

Occasionally a valid reply will not be received after interrogation of a remote. This may be due to message garbling (from channel noise), momentary communication failure, or other causes. If this occurs, the master station will automatically attempt a reinterrogation of this remote station. Should the "no-reply" condition persist after a second or third reinterrogation (under program control), the master station will now log the time, date, and identification of this "communication failure." By referring to this printed record the time, duration, and degree of each communication failure may be determined. This procedure is complete under program control and can be readily modified should the need arise.

REMOVE STATION

As noted previously a suitable remote station is disclosed in the specification and FIGS. 4–10 of the copending Arkin et al. application.

Each remote station usually consists of a Data Set (the interface with the communication facility), a Remote Station Control (the basic remote station housekeeping unit), an Analog/Digital Converter (to convert analog values to digital values capable of being transmitted over the communication facility), Input Circuitry (to serve as an interface between the system parameters to be sensed), an End Element Control circuit (used to recognize and act upon control messages), and the End Element Control Devices (which interface the data gathering and control system with the apparatus to be controlled).

Messages from the master station are detected by the Data Set and shifted serially into the Remote Station Control. Here the message is buffered, code checks are performed, and address decoding is attempted. After a successful decode, the Remote Station Control will apply a "mark" signal to the line and, after a line settling period, initiate a message to the master station. The first section of this message contains the address just received from the master station. A variable length message is employed. As many as eight blocks of information may make up a single message.

During transmission, the Remote Station Control regulates the information flow from the Input Circuitry through the Analog to Digital Converter (when required) and to the Data Set. It frames the data into the appropriate formed and appends message security check bits. The processing rate of the logic circuitry is such that internal manipulations occur at many times the maximum data transmission rate.

Control routines are afforded the security inherent in a check-before-operate sequence in *addition* to the message security techniques applicable to scanning and addressing messages. The control address and its modifier (a 12-bit word used to expand upon the address) are delivered to the remote station. They are buffered and returned to the master for verification. An activate command, common to all control functions within a given remote station, is then transmitted by the master to cause the remote to act upon the stored command. No End Element Control activity will take place unless the control routine is performed in this strictly regulated sequence. As the control function is initiated, the activate address is returned to the master station as a final acknowledgement.

MASTER STATION

The Master Station consists of a stored program digital processor and controller; i.e., a computer, served by a multiplicity of special purpose, wired program peripheral equipments, each designed to perform a specific task within the real time environment peculiar to that task.

The Master Station accomplishes routine tasks associated with the gathering and display of data, and the control of system points. It is so arranged that all units peripheral to the computer operate as "slaves" and as such, require not only data but instructions. This master-slave relationship between the computer and the peripheral units allows all peripheral units to be simple in nature, while maintaining a completely flexible system.

The major sections that make up the master station and a brief description of their operation follows. These sections are shown in FIG. 17.

The computer 1710 is a high-speed binary digital computer.

Program entry and output are provided as computer equipment accessories. These devices include devices 1720, the system loggers and paper tape handling equipment.

The multiplexer 1730 serves as an interface between the computer output registers and the peripheral devices. It develops sufficient drive to allow the multipling of peripheral devices on its common data and control highways, and it assures proper synchronization and coordination between the computer and the various peripheral devices. A brief description of its features follows:

Special cable receivers and cable drivers to transfer logic levels over lengthy cables are included in the multiplexer. These drivers allow the transfer of data to and from the computer as well as to and from the console update unit.

The task of internal housekeeping is performed by the multiplexer. A list of these tasks would include synchronization, special commands to and from the computer, concentration and development of interrupts, and automatic reset after the timeout of an alarm timer—thus preventing the possibility of a fautly controller tying up the entire system.

Since the computer has a 24-bit input/output register and the peripheral devices require a parallel transfer of up to forty eight bits, word packing and unpacking must be performed by the multiplexer. FIGS. 19 and 20 show typical 24-bit words that would be transferred to or from the computer.

Because of the timing delays inherent in the synchronization of asynchronous devices, and in order to avoid slowing the computer during an exchange of information with the peripheral devices, the multiplexer provides momentary storage of data to be transferred to the peripheral devices, thus requiring only a minimum amount of the computer's time in transferring data to them.

The line buffers 1740 and 1750 serve as the interface between the computer and the transmission facilities. The unit functions as a serial-to-parallel converter when in the receive mode and a parallel-to-serial converter when performing in the transmit mode. Included within the line buffer are storage elements and the control logic necessary to allow the line buffer to operate asynchronously with respect to the rest of the master station complex.

A line buffer such as 1740 may be thought of as the controlling mechanism that allows the computer to communicate with the remote stations. It receives instruction from the computer regarding the information that is to be transmitted to a remote, and upon receiving a reply from the previously addressed remote it buffer-stores the information and transfers it to the computer.

In performing its function the line buffer acts alternately as a code transmitter and receiver. It is a fully buffered, self-contained unit; that is, it contains all necessary storage and control circiutry needed to perform its function, thus allowing it to operate asynchronously with respect to the other components of the Master Station complex. Some of the major support tasks perfornmed by the control circuitry within the line buffer are:

(1) Count the number of bits in a block of data.

(2) Count the number of blocks that have been received from a previously addressed remote.

(3) Generate the proper 5-bit configuration of check bits associated with each transmission and the proper start and stop bit associated with each block transmitted.

(4) Check the validity of each block received.

(5) Buffer store data and commands.

(6) Perform synchronization between the line buffer and the multiplexer.

(7) Determine the bit rate at which the line buffer is to operate with the transmission clock.

(8) Perform the timing functions to determine no reply alarms, duration of pre-transmission mark, period of time that the receiver is to be squelched and initiate delay to assure the operation of the line switching relay before transmission is initiated.

In describing the operation of the line buffer, it will be assumed that it is idle and the computer wants to retrieve data from a given remote station. The computer would load the multiplexer with two 24-bit words as shown in FIG. 19A. The coded information in the first word would be interpreted by the line buffer in the following manner.

The first three bits would indicate the nature of the request. In this example, the load bit would be a logic "1," indicating the line buffer is to receive or load data. The next five bits "Device Select" would contain a discrete address assigned to the line buffer to load the data. The next twelve bits would describe the task that the line buffer is to perform. Included in this information would be: The number of blocks the line buffer can expect back from the remote, what line should be switched to the data set, the transmission speed to be used and a single bit to indicate if the present request for service requires a new line selection (this bit determines if the line buffer needs to provide the delay required for operation of the line switching relay). The second 24-bit word contains the address and modifier that is to be transmitted to the remote.

The line buffer transmits the address, modifier, and check bits, and after a squelch period (to allow the line to settle), monitors the line for a start bit transmitted by the addressed remote. Upon recognizing a start bit on the line, the line buffer receives the first block of serial data transmitted from the addressed remote. After receiving and checking the first block, it buffer stores the data, advances the block counter, and initiates an interrupt to the computer as the next block of data is being received from the remote. The computer (through the multiplexer) responds to the interrupt in the following way: The computer loads the multiplexer with a word similar to FIG. 19A. The acknowledge bit is set (a logic "1") and a coded address peculiar to the storage registers of the line buffer in question is presented in the "device select" segment of the data word. This address instructs the line buffer to gate a 24-bit word (similar to FIG. 19B) to the computer. This word contains information describing the data it has received. For example, what block of the data stream does the line buffer have stored? (In our example, Block #1); is the last block too be received? (No); and did it pass the secuirty check? (Yes). When the requested word has been gated to the computer, the acknowledge bit will be reset.

After the computer has received this information, it will once again load the multiplexer with a device select code. This code will initiate the gating of the next 24 bits of data that the line buffer has received to the computer.

The line switching unit 1760 is used to switch a line buffer and its associated data set to a selected line. It is made up of relays equipped with idle line terminations. The channel to be connected to the data set is determined by a select signal to the proper relay from the line buffer circuit.

The master station Data Sets 1745 and 1755 are the same basic units as is described in the application of D. M. Arkin et al. referenced previously. The data sets form the interface between the master station and the communication facility. One data set is assigned to each line buffer.

The console update unit 1770 is the "information translation buffer" between the dispatcher and all of the operating equipment of the Master Station.

The console update unit 1770 performs two major functions. First, it receives data and status information from all the remote stations presented to it by the computer (via the multiplex unit). It stores this information in the proper point storage. A separate storage device is provided for each; digital display, alarm lamp, and pushbutton indicator lamp on the dispatcher's control console. The unit's second function is to present information to the computer (via the multiplexer) when directed to do so by commands from the dispatcher's control console. All controls to be performed at the remote stations are generated through this unit to the computer. Based on information received from this unit, the computer generates the proper point address, which the line buffer then proceeds to send to the remote station to be controlled. In summary, this unit has basically two modes of operation: (1) update and store information; (2) control field points throughout the system.

In the update and store information mode of operation, all system data coming from the computer and intended for display will be received by the update portion of the unit, via two 24-bit buses from the multiplexer.

The command bus is continuously monitored by the "device select" unit. Since this bus is shared by several peripheral devices in the Master Station (under control of the computer), all addresses not meant for the panel control and data storage unit will be ignored. However, when the "panel advice required" address, together with a "load" signal, is detected, the remaining bits on the command bus are gated to the data location address unit. These remaining bits comprise the address of the proper digital display or status indication storage unit.

All of the storage devices monitor the data bus; however, only the particular device that has been selected by the access signal will be updated with the information presently existing on the data bus. As an example, if the incoming information is "volt-ampere" data and it is meant to be placed on a "volt-ampere" digital display, the command bus will contain (a) the panel service address, (b) a load signal and (c) the address of the volt-ampere digital display. The corresponding storage unit will be accessed, and the digital display updated. Status indications are updated in a similar manner.

In the control of field point mode of operation, it is possible to control any point in the system. To accomplish the control function, an "identity" (consisting of the address of the point in question and the function to be performed) is encoded.

When the computer is ready to receive data from the panel control and data storage unit, a signal will be presented to the "load identity" bus. The identity of the point and function to be performed is gated onto the identity bus. A second signal will be generated from the computer to load the data bus.

The dispatcher's console is that portion of the system which is directly operated upon by the system dispatcher, providing for the manual control and monitoring of system operation. It consists of various devices such as recorders, digital displays, digit switches, pushbuttons, lamps, etc., all of which present information of system status to the dispatcher.

The system recognizes two types of alarms; remotely supervised alarm contacts and communications alarms (generated at the master station).

The status of each remote alarm contact is displayed by means of an appropriate red light. All alarms will sound an audible signal and cause the proper red light to flash. When the operator presses the silence pushbutton on the Control Console, the audible signal will be silenced and the alarm lamp will glow steadily. When the supervised contact returns to its normal state, the corresponding red light will be extinguished.

There are four types of communications alarms which may occur; no reply, wrong address, "AB" bit errors, and security check errors. Regardless of which of these occur, a second attempt will be made to establish contact. If the second attempt is also in error, the computer program will indicate that a communication failure has occurred. No reply and wrong address implies that all data coming back from the remote is in error. AB bit errors and security check errors, however, are individual block errors. If either of these errors occur, those blocks that were correct will be saved. On the second transmission, an attempt to fill in the mising block/s will be made. If on either the first or second try any one block was received correctly, no communication error is indicated. However, all data that was not correct will not be saved and the currently stored old data will be used in its place. Also, an indicator will show that this is old data if it is requested to be logged. The same scheme will be used for all data if a communication fault occurs. When a communication fault occurs, a program indicator is set. At the end of the scan if any station has set this indicator, the corresponding communications alarm lamp will be lit. If at the end of the scan this flag is not set, the lamp will be extinguished.

For the present system, a logger as an output device 1720 may be used to print station operating information. A request for initiating a printout can be initiated either automatically or manually. Under program control, the computer will initiate a request for logging data from all stations at predetermined times. The dispatcher can manually initiate a log request from the Control Console in one of the following ways:

Depress a "System Log" pushbutton, which then lights. Depress the "Control Execute" pushbutton, executing the log request and extinguishing the "System Log" pushbutton lamp.

Select an individual station pushbutton, which then lights. Depress the "Station Log" pushbutton which also lights. Depress the "Control Execute" pushbutton, executing the log request and extinguishing the selection lights.

A significant characteristic of the present system is the rate at which it is capable of developing, transmitting and displaying data. Its information rate (the rate at which *useful* information is gathered by the master station) is remarkably high.

The conventional data gathering technique of addressing on a per-point basis is not necessary in this system. Rather, each remote station reply is tailored to the data reporting needs of that station; i.e., messages of differing lengths are used throughout the system. The implementation of this scheme is such as to simplify organization.

The basic data communication information unit is the "block" of 31 bits (binary digits). See FIG. 21. A Remote Station response to a scan address may consist of as many as eight or as few as one blocks of information. Each block is an independent unit whose integrity is independent of that of other blocks within a given transmission; i.e., a single block incurring an error in transmission in no way invalidates preceding or succeeding blocks.

The block is subdivided into two, 12-bit data sections and a 5-bit security section. (Actually, the last bit of each of these 13-bit sections is used to indicate whether the message originated at the Master Station or at a Remote Station—and thus there are two, 12-bit sections which can carry useful information.) There are no restrictions as to the format of the 12 bits of the information section; error detection is purely a function of the 5-bit security section. Each section then can contain a three-digit value (expressed in BCD) or as many as twelve alarms or other indications.

FIG. 21 portrays the message format applicable to the retrieval of data from the field. The master station transmits a 12-bit address contained within the first section of a one block message. The second section of the block is not used in the case of scan address transmissions, but to satisfy the message security format, redundant binary digit are transmitted. For security purposes the remote station reply always includes (as the first section of the first block), the scan address that initiated the reply transmission. Each subsequent data section (as many as fifteen may be included) contains field data; either a digitized analog signal or twelve alarms or indications. Thus, a total of fifteen digitized analog signals, one hundred eighty bits of status information, or a combination thereof, may be included in a single reply message.

Several advantages accrue from the use of a variable length message. Turn around time is substantially reduced because many data points are interrogated with a single transmission. The adverse effect of propagation delay and data set delay is similarly reduced. Pre-balancing of the Analog/Digital Converter is accomplished since, as one data value is being transmitted, another A/D conversion is taking place. Transmission time is sharply reduced because fewer addresses need to be transmitted (a single address can return as many as one hundred eighty field indications). The cumulative effect is such that the scan time of a system organized on a variable message length basis is appreciably shorter than that of a one-address per-point system. Message timing is considered in detail later on.

Control messages are shaped into the same message format as are scan messages. The second section of the address block, however, heretofore unused, is exploited to advantage. It is used to modify or expand upon the basic control address. In the case of on-off control, the twelve useful bits of the modifier are used to indicate which device and/or which function is to be energized.

The control message is returned to the master station for verification. If this check is satisfactory and if the normal error checking routine is satisfied, an "activate" message common to all controls within a given remote station (but recognized *only* by the previously addressed remote) is transmitted to the remote station. This causes the remote to initiate the desired activiy, and as this action begins, the activate message is returned to the master as an acknowledgement.

As indicated, addressing is not performed on a perpoint basis but rather on a per-reply basis. Each address, when used to scan, has the power to cause the remote station to initiate an eight block reply. This reply can contain as many as fifteen digitized analog values or one hundred eighty alarms or indications, or combinations thereof.

The present system is designed to develop and transmit data serially at rates up to twenty four hundred bits per second. The following transmission rates are considered standard, although almost any transmission rate within this range may be accommodated: 2400, 1200, 600, 300, 150, 75, 30, and 15-bits per second. Transmission speed is a function of the system clock (a crystal controlled oscillator).

Transmission may take place over virtually any type of facility; such as private line, telephone company provided DC facility, teletypewriter channel, narrow band tone facilities, fully equalized voice facility, or in any combination of the above.

A further understanding of the system may be had by reference to FIGS. 1–16 of the drawings and the following detailed description of the major portions of a supervisory and control system master control station that embodies the present invention.

MULTIPLEXER

The multiplexer circuitry shown in FIGS. 1–4 inclusive provides the interface between the master station disclosed here and the associated computer. For purposes of this disclosure a computer having the necessary requirements would be as noted previously one similar to that manufactured by Scientific Data Systems Incorporated, and designated SDS920.

The multiplexer circuitry provides buffer storage to store instructions received from the computer for the master station.

The multiplexer may be thought of as a data controller in that it controls the flow of data between the computer and the master station complex. The multiplexer is provided with a plurality of buffer storage registers to minimize the time required to accomplish the transfer of data. In performing its tasks the multiplexer accepts and stores two words from the computer, develops a single instruction word, determines which line buffer or console update circuit is to receive instruction and then proceeds to load that instruction into the device. When data from the master station is to be transferred into the computer, the multiplexer will generate an interrupt to the computer. When the computer then requests a data word from the interrupting device, the multiplexer will determine which word is requested and gate that word into the computer.

It is possible for the multiplexer to be in the process of loading an instruction word into one device and simultaneously gate a data word from any other device into the computer. Before discussing the operation of the multiplexer in detail a brief discussion of the interface between the multiplexer and the computer is required.

Figure 2:
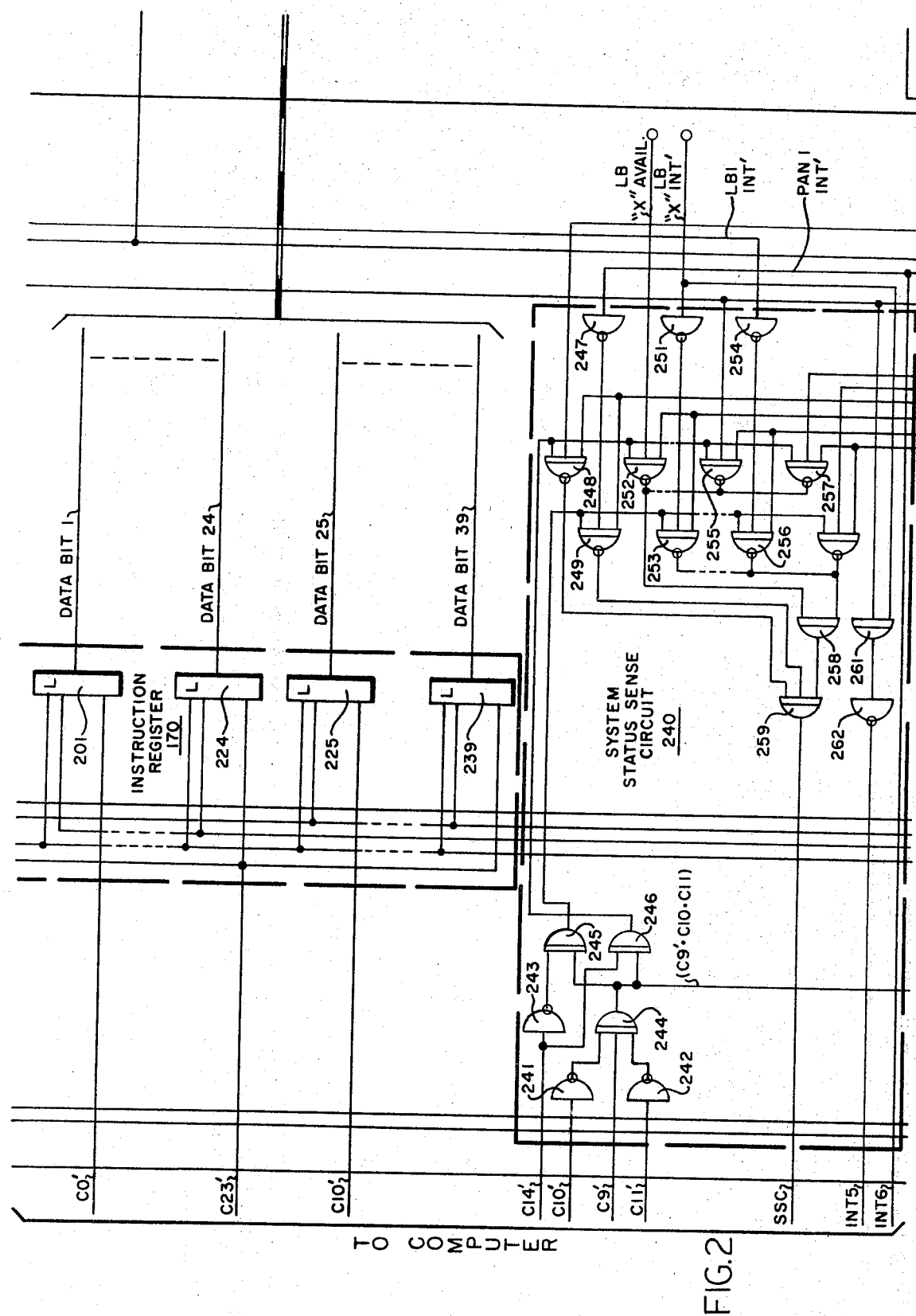
Figure 3:
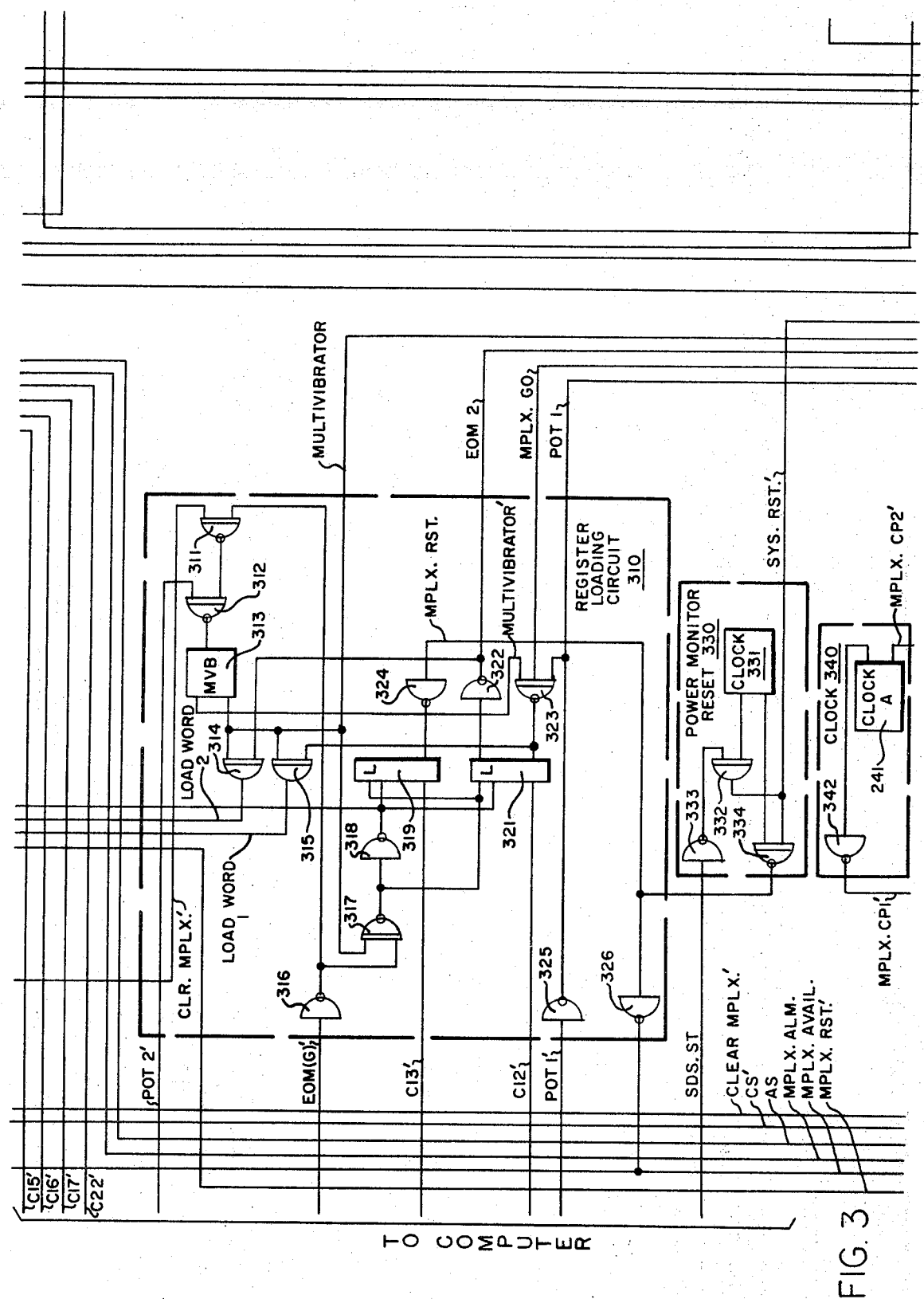

The interface is defined as that point where the multiplexer of FIGS. 1–4 inclusive meets a computer such as the previously referred to. The interface consists of twenty four parallel output data lines designated C0' to C23' a portion of which are shown in FIGS. 1, 2 and 3. Further twenty four parallel input data lines designated CD0 to CD23 are included as shown in FIG. 1. Additionally six control lines designated SDS ST, POT–1', POT–2', EOMG', SSC and RTI plus two priority interrupt levels designated INT5 and INT6. With the exception of the interrupt levels, signals appear on these lines whenever the computer executes any one of four types of instructions used to directly control input or output operations.

These instructions include: energize output M (EOM), parallel output (POT), parallel input (PIN) and "skip-on-signal-not-set" (SKS). The EOM instruction signal is primarily to provide control information to the input and output channels of the associated computer and to external equipment such as the present supervisory system. The POT instruction signal will cause the transfer of twenty four bits of data received from the associated computer to the selected input output device. A POT instruction is always preceded by an EOM instruction signal to select the proper device and give it the necessary control information. The PIN instruction signal will cause the transfer of twenty four bits of data from the selected input output device into the computer. A PIN instruction signal is always preceded by an EOM instruction to select the device and give it the appropriate control instructions.

The SKS instruction is used to sense the status of various external signals or external devices.

The output of the computer to the multiplexer of FIGS. 1–4 inclusive consists of POT signals for two twenty four bit words to the multiplexer via leads C0' to C23'. These leads extend to the instruction register 170, the end of message register 140 and the system status sense circuit 240. These circuits act as a buffer and temporarily store the POT signals from the computer. The multiplexer will then decode the device select address by virtue of the address decoder 160 and load a 39-bit word via the data bit leads 1 to 39 inclusive into the desired line buffer or console update circuit. The line buffer and console update circuits will be discussed later. The multiplexer will then check to see if the desired device answers back. If the address device failed to reply the multiplexer will set a multpilexer alarm bit extended from gate 425 and reset the system status sense circuit 240 so the multiplexer returns to the available state. The maximum unavailable time for the multiplexer circuitry is 160 microseconds. Before the computer can extend POT signals to the multiplexer it must first determine the availability of the multiplexer, the availability of the desired device and the status of the multiplex alarm bit via a series of SKS instructions.

Figure 4:
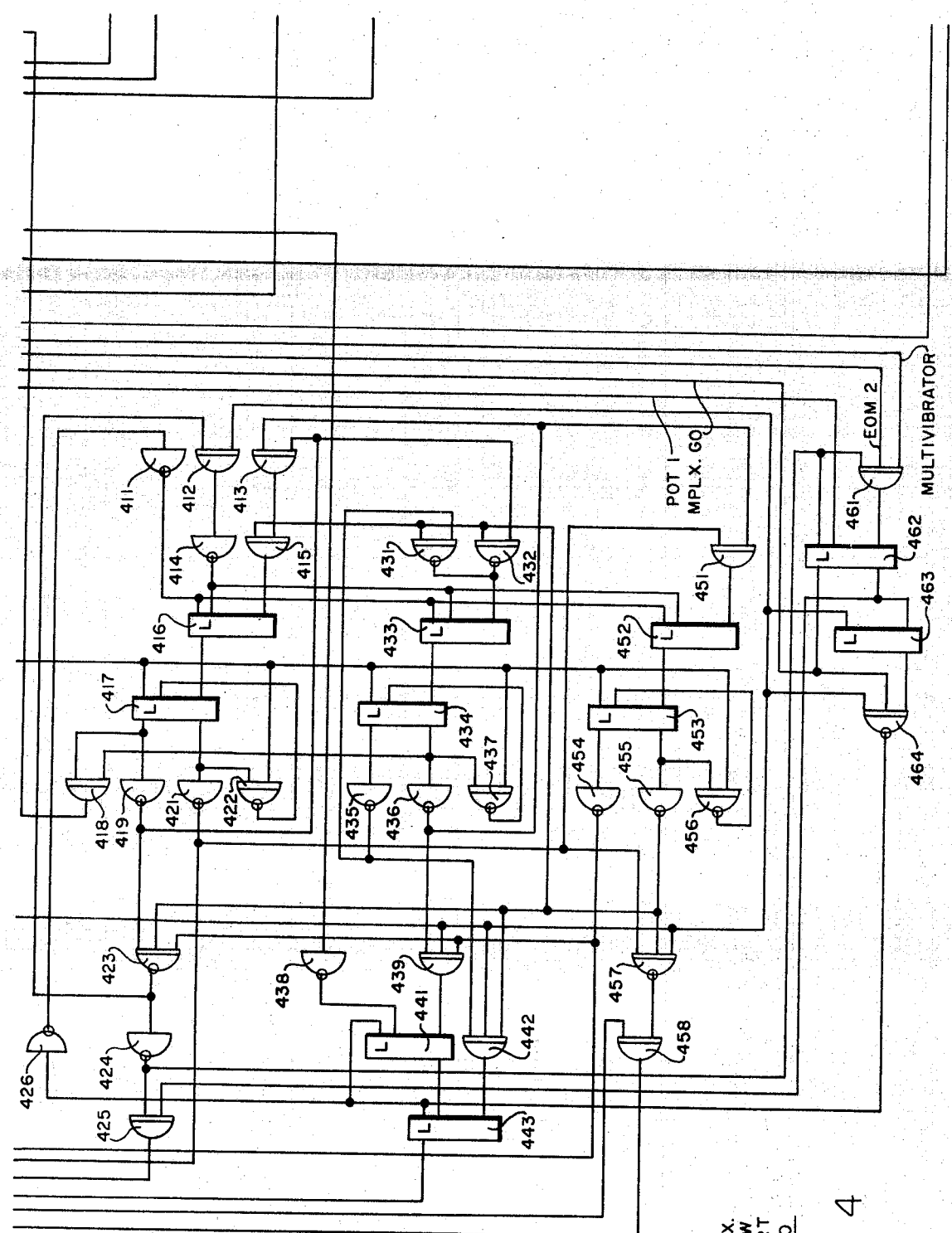

The multiplexer has a separate dedicated buffer 130 for storing EOM codes for PIN instructions which functions independently of the multiplexer flow chart 400 shown in FIG. 4. The multiplexer can decode twenty four EOM (PIN) codes each of which may be used to gate twenty four bits of data onto the PIN highway represented by leads CD0 to CD23 of FIG. 1. Two EOM codes are required for each line buffer and would be selected from the group 000 to 027 extending from the address decoder 160. One EOM code is required for each twenty four bit word from the console update circuit and is so designated as pan EOM extending from the address decoder 160.

The present system is equipped with two levels of interrupt. The multiplexer forms one common interrupt signal for all line buffers and a second common interrupt for all console update circuits. In the present embodiment only one line buffer and one console update circuit are shown in detail, however, provision for additional units is provided. Any interrupting device will continue to interrupt until it is serviced by the computer.

Line buffer interrupt signals are of the higher priority and must be serviced within one section period (10.4 milliseconds at 1200 B.P.S.) after the interrupt has occurred. Interrupt signals from the console update circuit can be generated as a result of a dispatcher's action. Although the interrupt signal is removed when the EOM for the status word is received by the console update circuit, the computer must acknowledge a dispatcher initiated interrupt by means of an update cycle and by loading console device address 000 and marking bit B12. The interrupt generated at the request of the computer is removed when the computer causes a new update to occur.

The multiplexer provides the necessary gates used to develop the reply for the SKS instruction. The interrupt time and the available signals from line buffers or console update circuits are engineered to the proper inputs. These are found and appropriately designated in the system status sense circuit 240. Typical of an unused line buffer interrupt termination and line buffer available signal termination are the leads designated LB "X" and LB "X" INT'. The MPLX available and the MPLX alarm signals from the flow chart 400 are wired directly into the system status sense circuit 240. By use of certain predetermined codes which may be arbitrarily selected the availability of any device, the source of any interrupt or the presence of an MPLX alarm may be determined.

Because the multiplexer performs two separate functions further discussion will be divided according to function. The multiplex function of the circuit employs the instruction register 170, the end of message register 140, the flow chart 400, the system status sense circuit 240, the gating for the parallel input data 130, the power monitor reset circuitry 330 and the necessary connections to the computer.

The instruction register 170 is a 43 bit latch register which is loaded from the computer. Bits one to twenty four are loaded from bits received over leads designated C0 to C23 from the parallel output of the computer when the POT instruction is preceded by the EOM code for word one. Bits twenty five to forty three are loaded from bits C0 to C23 of the parallel output when the POT instruction is preceded by the EOM code for word two. After the flow chart has transferred the instruction to the device it then clears the register.

The loading signal is developed as follows. When the computer enters a POT instruction, it brings up the POT1 signal and then waits until lead RT1 goes to ground, then brings up the POT2 signal. This signal is fed into the multivibrator 313 in the register loading circuit 310 which generates a one thousand nanosecond pulse, 600 nanoseconds after the POT2 signal comes up. This one thousand nanosecond pulse is gated to load the proper half of the instruction register with the load word one signal extending from gate 315 and the load word two signal from gate 314.

The EOM storage registers store the two special EOM codes (bits C12' and C13') used for POT instructions to the multiplexer and stores the five bits C19' to C23' of the EOM instruction and also decodes up to twenty four codes for gating data on a parallel input or PIN instruction. The latches 319 and 321 which store the C12' and C13' bits respectively are pulsed whenever the lead EOM (G)' signal and the output of the multivibrator 313 are true. To prevent a POT instruction intended for some other device attached to the POT connector of the computer from destroying the second half of the instruction word, the EOM2 latch is reset by gate 323.

The register storing the EOM code for a PIN Instruction is loaded when the EOM (G)' lead is true and the multivibrator 313 output is true. However, the register is cleared at the end of the PIN instruction by the RT1 pulse extended into the end of send message register 140.

The multiplexer flow chart 400 is a latch counter which once it receives a start pulse, receives free running clock pulses from clock 340 until it reaches its idle state (state zero). When the flow chart receives the start pulse it advances to state one and brings up the device load signal and the decoded device select signal. Since it is now receiving free running clock pulses the flow chart will advance to state two with the device load signal dropped with the device selected still held up. During the state two of the flow chart, the selected device must acknowledge the loading and the multiplexer must store the acknowledgement. The counter will advance to state three where it drops the device select and tests for a request for service signal. If there is a request for service the counter will go to state four and load the instruction register from the device requesting service. It will then advance to state one and repeat the loading of the selected device. If when it reaches state three there is no request, it would go to state five and if the device loaded with the computer instruction did not acknowledge, the multiplexer alarm bit will be set and the counter will go to the idle state (state zero). The flow chart will normally cycle through the loops of state 4, 1, 2 and 3 only once because the device requesting service normally requires a minimum of 50 milliseconds before it can request service again and the flow chart will complete service returning to the idle state. The start pulse circuit shown in FIG. 4 is a portion of the multiplex flow chart and consists of gates 464 and 461 and latches 463 and 462. The start pulse circuit will gate the first full multiplex CP1 pulse after the leading edge of the multivibrator output pulse during the second POT instruction for the multiplexer to the flow chart circuit. When the computer submits an SKS instruction signal to test the condition of the device in the master station, bits C9', C10' and C11' all go true and an information pattern is set up on lines C12' to C23'. If the condition being tested for is true the SSC signal derived from the output of gate 259 will go true. At this time the computer will strobe at the end of the instruction.

It should be noted that during an EOM instruction for the master station, the bits C9', C10' and C11' also are true. However, because the computer is not executing an SKS instruction, it would ignore the status of the SSC signal. As shown in the present system the LBX available and LBX interrupt' circuits representing additional line buffers are not wired. The multiplexer includes the parallel input data detector 130 for receiving signals over the PIN data bus originating in a line buffer or the console update circuit in the master station. Data appearing on this twenty four bit bus and entering the computer on leads CD0 to CD23, is in the TRUE form.

The multiplexer also includes the power monitor reset circuit 330 which monitors a +12 volt power supply. When the power is turned on the system reset prime signal is generated for up to six seconds after the power is on. This signal resets all line buffers and console update circuits.

The multiplexer is designed to accommodate POT and PIN signals received over cables of varying length. Because of variations in cable characteristics there will be skewing of data with respect to the POT2 signal. To insure that data lines are stable when the data present is stored, the one shot multivibrator 313 shown in FIG. 3 is triggered on the leading of the POT2' signal. The multivibrator will then generate a one thousand nanosecond pulse referred to as the multivibrator signal, six hundred nanoseconds after the leading edge of the input signal.

The interface with a computer such as the Scientific Data Systems Model 920 consists of those leads so designated as being connected directly to the computer in FIGS. 1, 2 and 3.

During typical operation the computer will on a parallel output basis transmitting two words into the multiplexer which will load a selected device. At some later time the device will interrupt the computer, and the computer will perform a series of SKS tests to determine the origin of the interrupt, it will then proceed to receive parallel input data sent into the computer. The computer will then perform an additional SKS test to determine the availability of the device and the availability of the multiplexer before it will transmit parallel output signals consisting of another pair of words into the multiplexer.

LINE BUFFER

Figure 7:
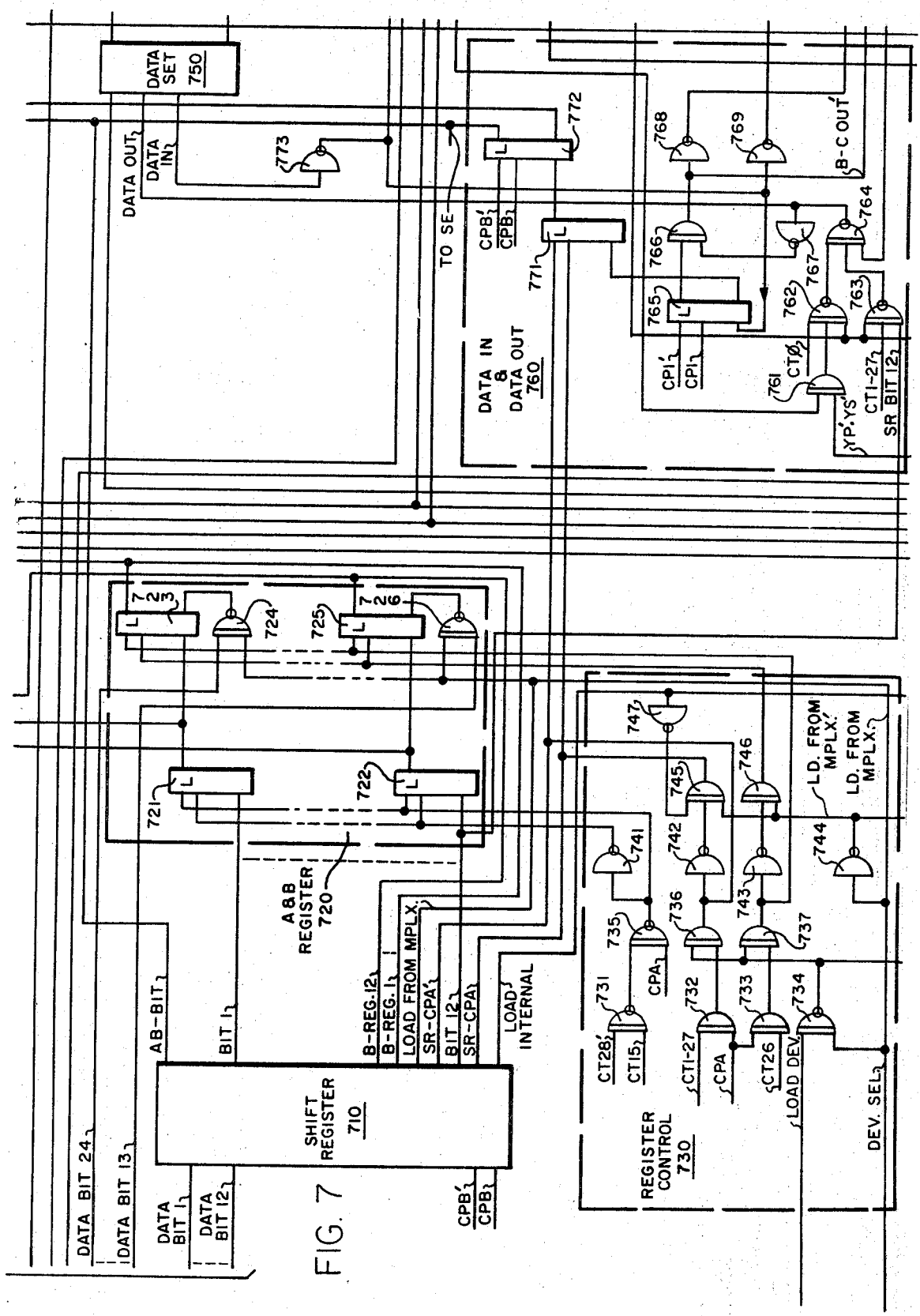
Figure 8:
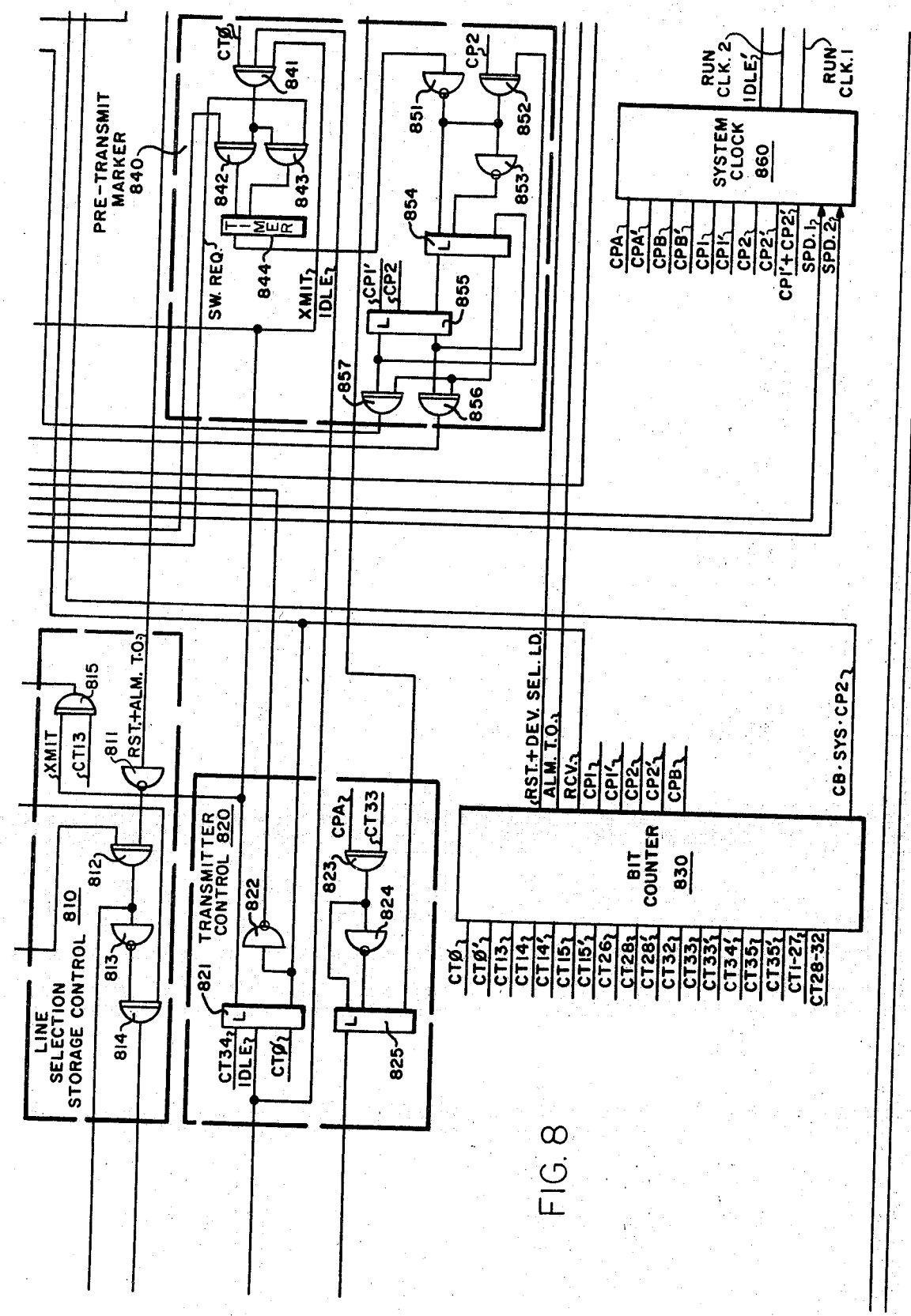
Figure 9:
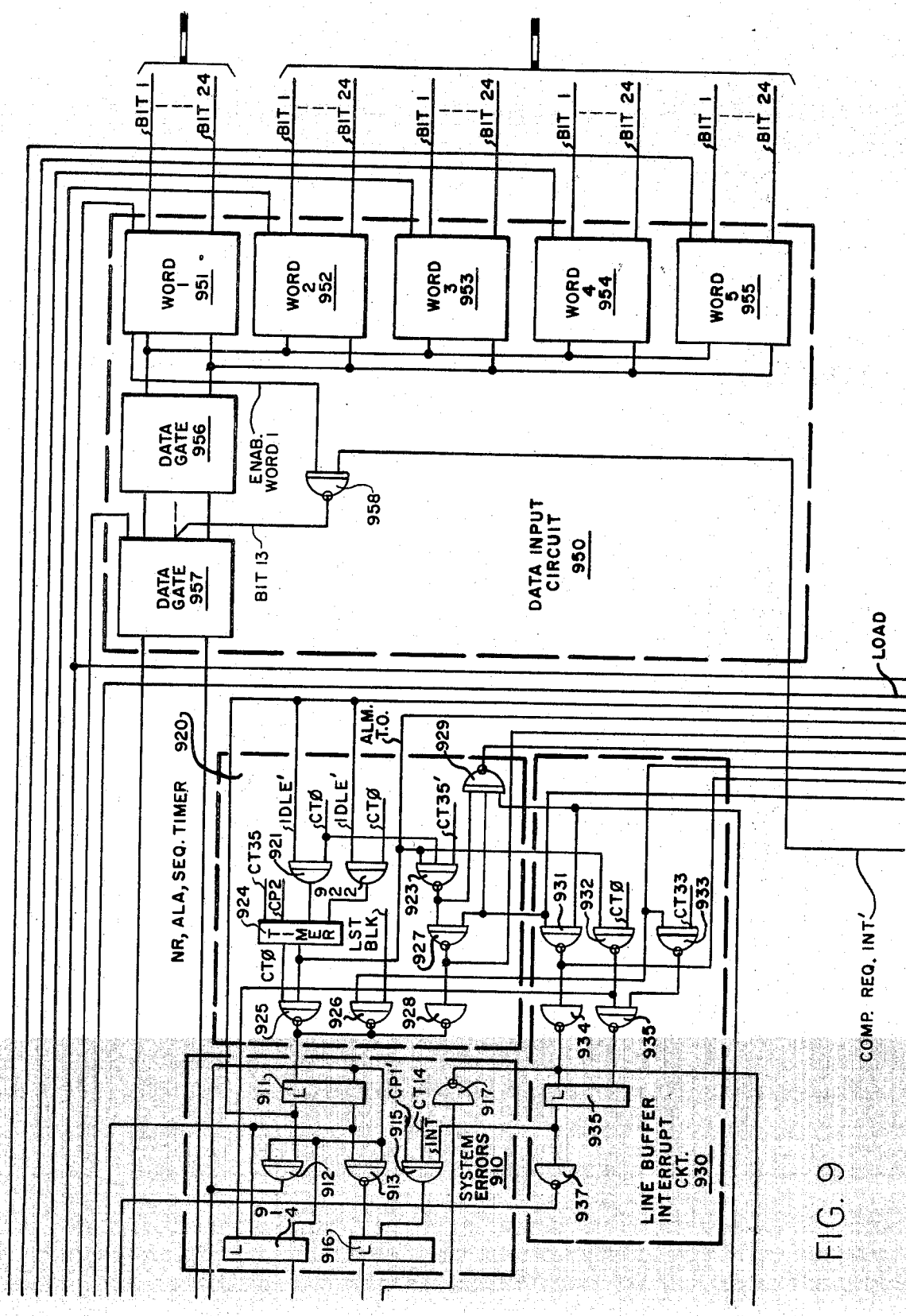
Figure 10:
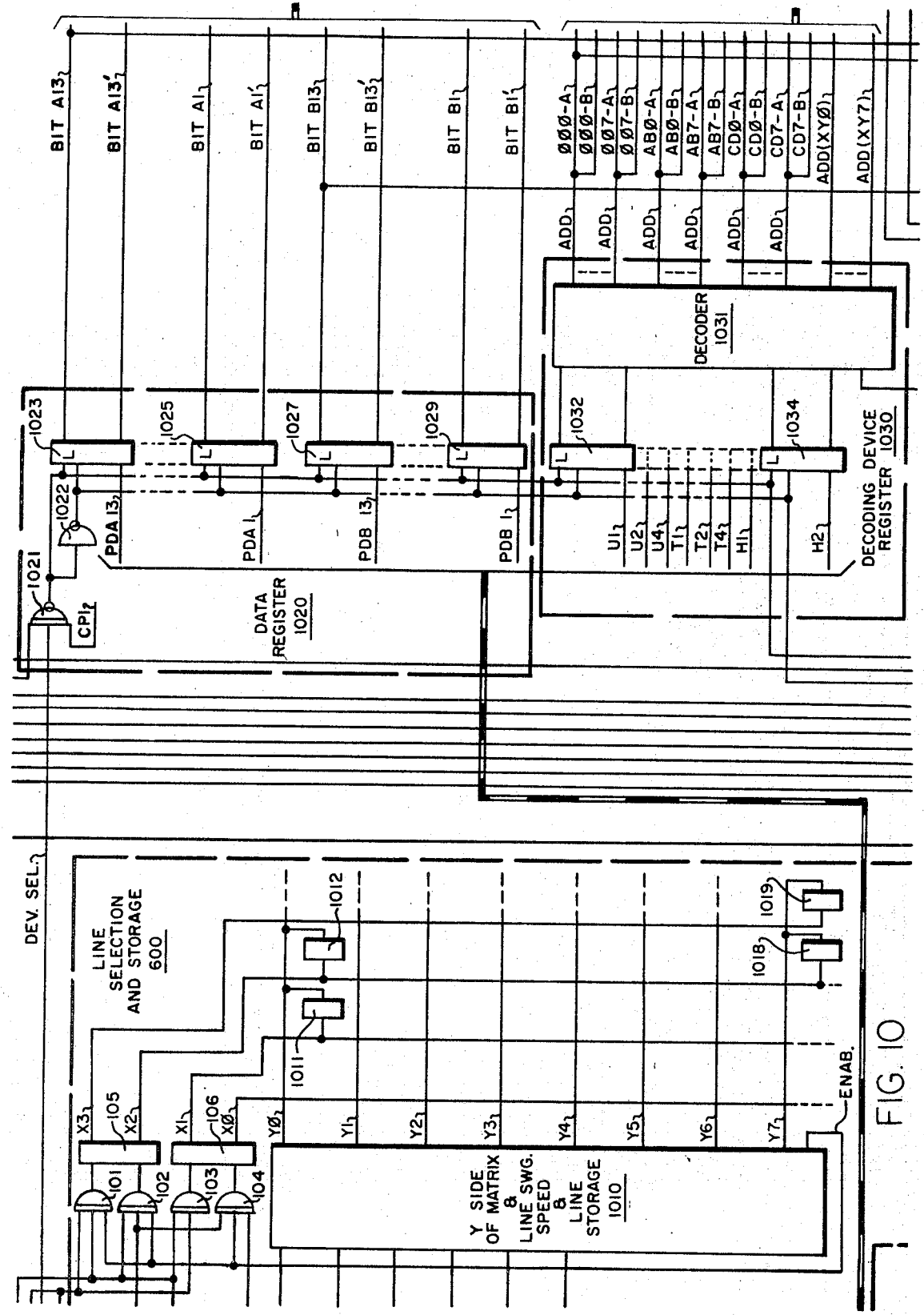
Figure 11:
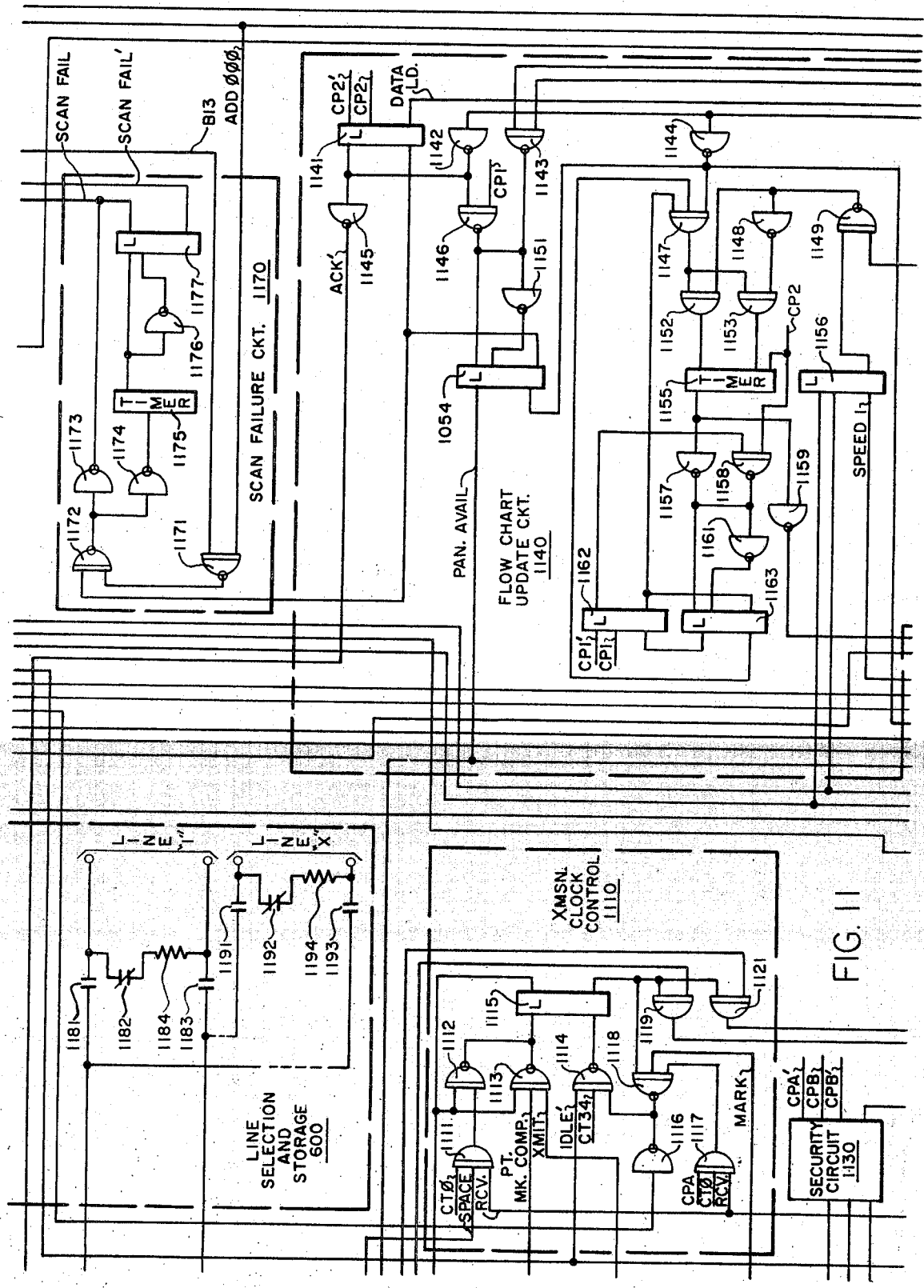

The line buffer circuitry is shown on FIGS. 5–8 and on portions of FIGS. 9–11. The line buffer provides an interface between the computer and the transmission facilities such as a telephone line, VHF radio channel, carrier equipment, etc. A large number of communication channels may be utilized based on the ability of the line selection and storage matrix 600 to select up to 32 different line facilities.

Figure 6:
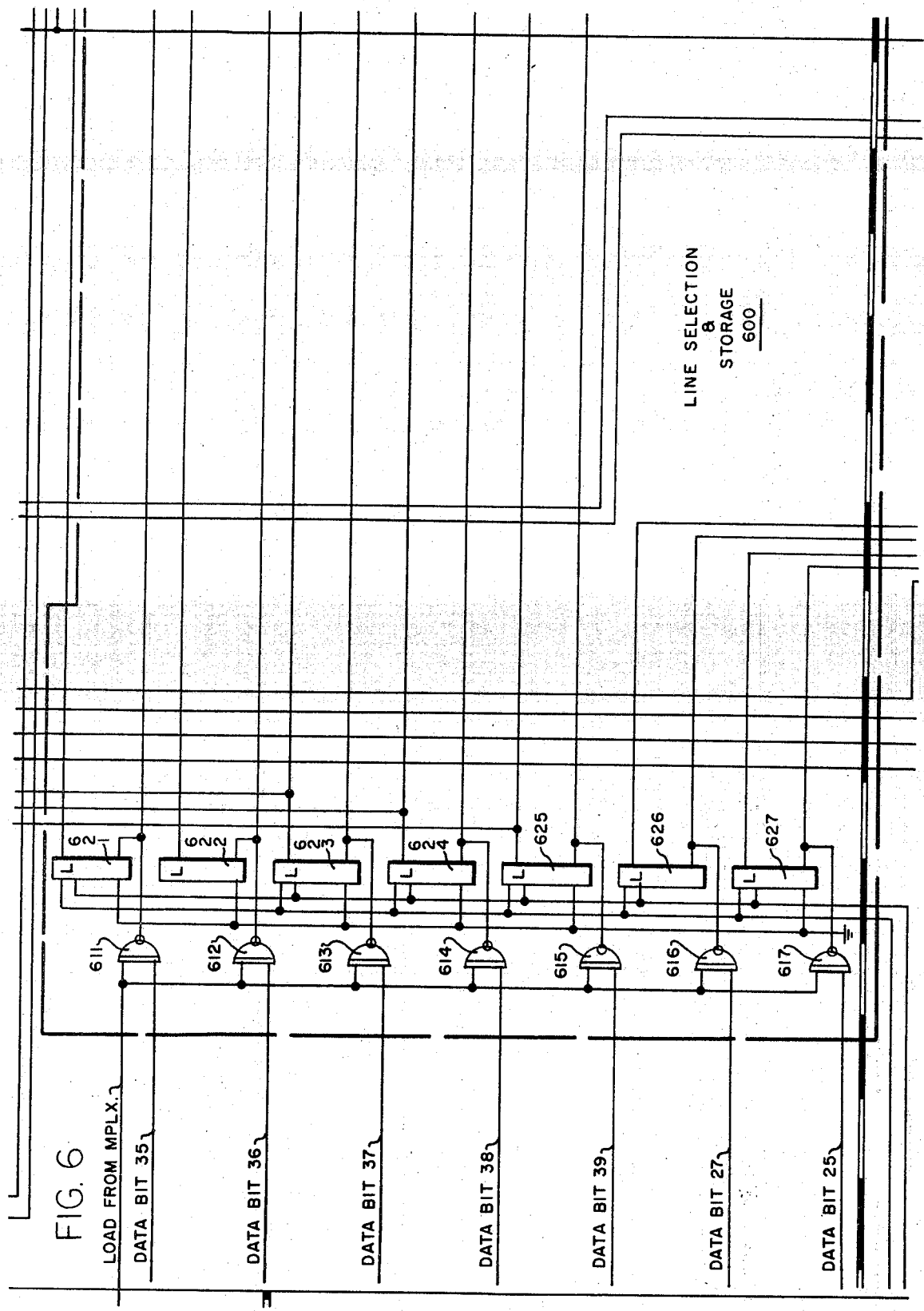

As shown on FIG. 11 a first line designated as line one is followed by an undetermined number of lines terminating or ending with line X. The line buffer functions as a serial to parallel converter when in the receive mode and as a parallel to serial converter when in the transmit mode. Typically during its operation it accepts and stores instructions from the computer, provides line selection through the previously mentioned matrix, and may transmit and receive either of two different bit rates under control of the computer. The line buffer also performs the necessary message security checking on all transmitted or received messages. It includes a timer to time out when no reply is received in response to a message transmitted. It acts to buffer one block (twenty four bits) of received data for the computer. The line buffer also under control of the computer is capable of receiving variable message lengths. In describing the operation of the line buffer it will be assumed that it is idle and the computer wishes to retrieve data from a specific remote station. The computer will load the previously discussed multiplexer with two twenty four bit words and the multiplexer will then load the line buffer with thirty five bits of data over the leads designated data bit-1 to data bit-35 that extend from the multiplexer into the line buffer as shown in FIGS. 6 and 7. The line buffer will then interpret these bits in the following manner. The first twenty four bits will contain the address and modifier that is to be transmitted to the remote station. The remaining eleven bits will describe the task the line buffer is to perform. Included in this information would be the number of blocks the line buffer can expect back from the remote, what line should be switched to the data set 750, the transmission speed to be used, and a single bit to indicate if the present request for service requires a new line selection. This latter bit would indicate if the line buffer should provide the necessary delay required for operation of the line switching relay such as 1011, 1012, etc.

The line buffer will then transmit the address modifier and check bits, and after a squelch period permitting the line to settle, monitor the line for a start bit transmitted by the addressed remote station. Upon recognizing a start bit on the line the line buffer will receive the first block of serial data transmitted from the addressed remote. After receiving and checking the first block of data bits, the line buffer will store the data, advance the block counter 530 and initiate an interrupt to the computer as the next block of data is being received from the remote station. The computer (through the multiplexer) will respond to the interrupt by instructing the line buffer to gate two 24-bit words back to the computer on the PIN highway that extends from the data input circuit 950 at gate 957 to the multiplexer and then to the computer.

The first 24-bit word contains the block (two sections) of data just received by the line buffer. Word two contains the block number identification, the line that the data was received from and error information. The errors indicated by the line buffer are security error, $A/B$ bit error, no reply error and missed interrupt error. The termination of these signals in the parallel data circuit 510 may be seen by reference to FIG. 5. The missed interrupt error is an indication that the computer did not respond fast enough to the interrupt signal generated by the line buffer, and the data can no longer be relied on as valid. A series of interrupts and gating of data to the computer will continue until the line buffer has received the desired number of blocks. After receiving the last block the line buffer will return to its idle state and wait for a new request for service by the computer.

The line buffer circuitry is best explained by dividing it into its major functions and discussing the operation of each of the functions. The functional circuits that go to make up the line buffer includes a system clock 860, the transmission clock control 1110, the no reply, squelch, and alarm timer 920, the bit counter 830, the block counter and parity circuit 530, the security circuit 1130, shift register 710, A and B bit registers 720, the line selection and storage circuit 600 and the data set interface or data in and data out circuit 760.

The system clock 860 shown in FIG. 8 includes a free running two phase crystal control clock pulse source. The two phases are referred to as CP1 and CP2 throughout the master station. The pulse duration is three microseconds and the period is determined by the crystal frequency. The two pulses are 180° out of phase with respect to each other.

Transmission clock pulses are derived from the crystal control clock source now referred to as CPA and CPB. Both CPA and CPB are a function of CP2 and are also 180° out of phase with respect to each other.

When the system clock is enabled, a binary ripple counter is allowed to count the CP1 pulses. After enough CP1 pulses are counted to correspond to one half a transmission bit period, a CP2 is gated through the clock becoming CPA. After enough CP1's are counted to correspond to one full transmission period, a CP2 will be gated through the clock becoming CPB. The counter resets and counting begins again for the next transmission bit. The number of system clock pulse counts for each transmission clock pulse is determined by the system clock frequency. Logis circuitry is also included in the system clock to permit switching from one clock speed to another. When the selection is made by the computer and received via the data bit 27 lead from the computer a switch from one speed to another can be made. Clock switching under program control takes place only when the line buffer is in its idle state. Additionally required pulses based on CP1, CP2, CPA and CPB are derived by logic circutry to provide such pulses as CPA', CPB', CP1', CP2', etc.

The transmission clock control circuit 1110 is shown in FIG. 11. When in the transmit mode the time out clock pulse of the pretransmission mark timer 844 will reset latch 1115 which in turn starts the transmission clock counter. The transmission clock will continue to run until the bit counter 830 reaches count 34 (CT34) when latch 1115 will be set. When in the receive mode, the transmission clock starts on the leading edge of the received start bit (space). The first transmission clock pulse (CPA) is in the center of the start bit and will set a latch in the bit counter 830 if at that time the line is no longer in the space condition. In this way the transmission clock is stopped if it had been started erroneously by noise in the transmission channel. After the clock has been stopped all circuits are back in the normal receive condition waiting for the leading edge of the start bit. If at the time of the first transmission clock pulse, the transmission line is still in the space condition the start bit is considered valid and latch 1115 will remain in the reset condition allowing the transmission clock to run until the end of the last block received, when the line buffer returns to its idle state.

The pretransmit marker 840 shown in FIG. 8 has its inputs enabled at the beginning of the transmit mode depending upon the last transmission line selected. The pretransmission mark period must be longer than the remote station squelch period. The pretransmission mark with the line switch period must be long enough to cover line switching in addition to the normal pretransmission mark. The squelch, no reply and alarm timers 920 are shown on FIG. 9. The squelch timer is enabled at the beginning of the receive mode (count CT35) and is used to block the data receiving set long enough to allow transients to diminish. The no reply time out input is enabled whenever the bit counter is in CT0 and the line buffer is not in its idle state. This timer input is adjusted to exceed the maximum remote station turn around time plus the pretransmission mark. A timer clock pulse caused by this input will set the no reply latch 914 to initiate an interrupt to the computer by way of the parallel data circuit 510, which will cause the line buffer to return to its idle state.

Whenever the line buffer is not idle or in the CT0 state the alarm timer input will be enabled. Should the line buffer fail to return to CT0 within a normal period of time this timer will cause automatic reset of the line buffer.

The bit counter 830 shown in FIG. 8 is a binary counter capable of counting from 0 through 35. Conventional in design it serves as the heart of the line buffer. The entire operation of the line buffer is based on what count is presently stored in the counter. These counts are utilized throughout the entire line buffer and system and are designated CT0 through CT35 as well as inversions and combinations of these counts. Generally the counter is incremented as a function of the CPB pulse and in special cases as a function of CP2. The special cases include the incrementing of the counter from count 14 to count 15 (CT14 to CT15) and CT34 to CT35. It should be noted that the exit from the count of CT35 to the count of CT0 is implemented as a function of the squelch time out circuitry.

Included in the bit counter is logic circuitry to assure synchronization of the various timer relationships of the bit counter and a bit counter decoding circuit for decoding various key counts in the bit counter for use by the line buffer.

Figure 5:
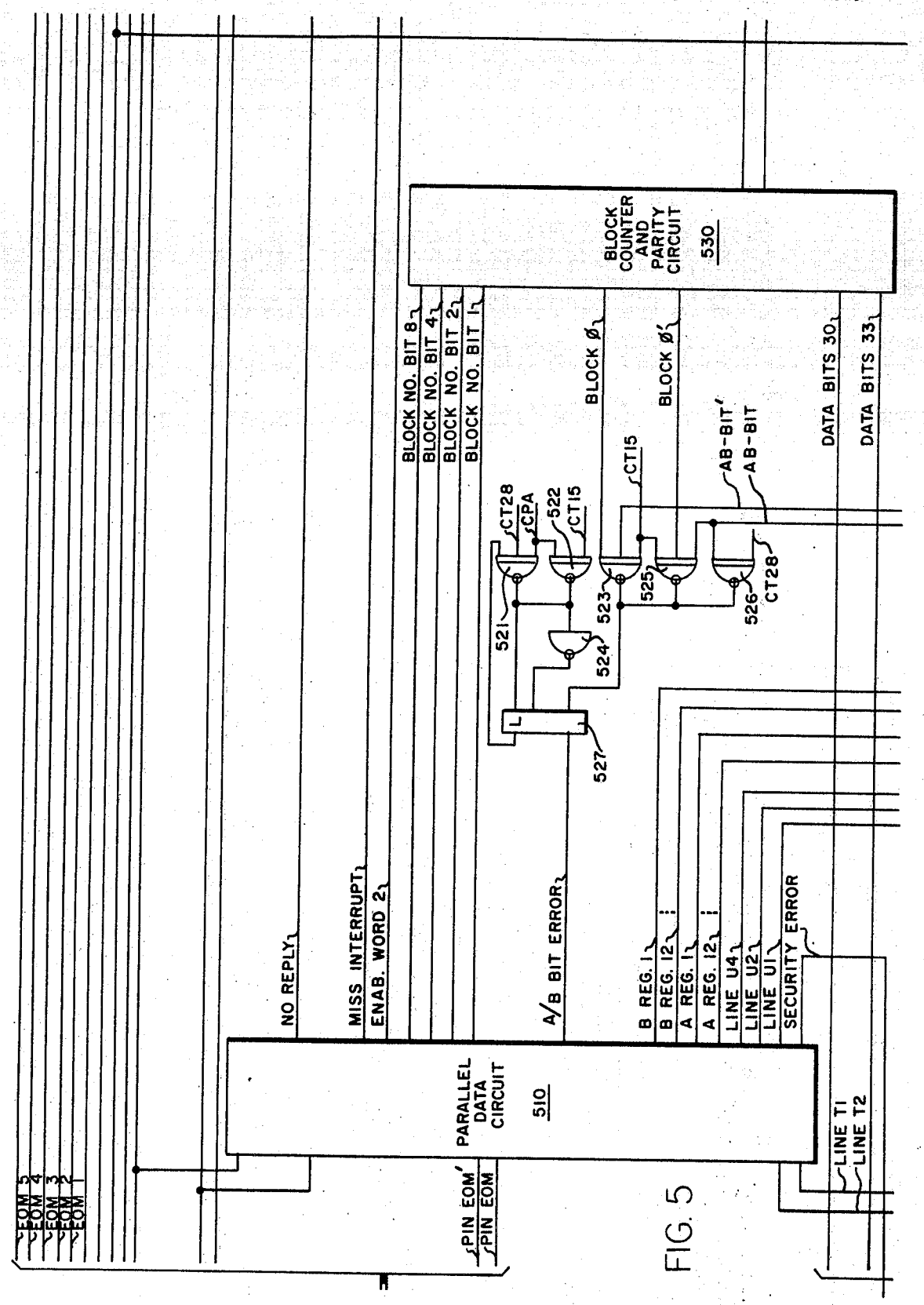

The block counter and parity circuit 530 shown in FIG. 5 includes a four bit binary ripple counter which acts to count the blocks and advances in response to the count of CT32, CPA and receive mode signals. It is reset every time a new instruction is received from the computer. Also included in the block counter parity circuit is a four bit register loaded from the computer to indicate how many blocks the line buffer is to receive. The parity circuit portion compares the block counter to the blocks to be received in the register, and when parity occurs during the CT33 count a last block received latch will be set. This latch is reset when a new instruction is received from the computer.

The security circuit 1130 shown in FIG. 11 is similar to that disclosed in the previously referenced copending Arkin et al., application and contains the security register and control circuitry. Five check bits are encoded or decoded as a function of the five bit register and two exclusive OR gates. The error check is satisfactory if the shift register has all zeros after receiving a complete block. The register is reset on the count of CT0 or CT33. Normally the register primary is loaded on CPA and the secondary is shifted on CPB. When in the transmit mode, the exclusive OR circuits are disabled while check bits are being transmitted.

The data registers are shown in FIG. 7 as shift register 710 and A and B register 720. The shift register 710 is a 13-bit shift register and the A and B register 720 includes two 12-bit non shifting registers.

The shift register 710 is a 13-bit parallel load parallel dump serial shift register. Information to be transmitted is parallel loaded over the leads data bit-1 to data bit-12 and the AB bit lead, thirteen bits at a time into the shift register primary and then shifted to the line communication equipment one bit at a time. The first bit to be transmitted is designated bit-12 and loaded into latch 721. The last bit in each bit section is the A or B bit.

The data storage register or A and B register 720 consist of register A including latches 721 through 722 parallel loaded from the transceiver shift register as each 13-bit section is received. Register B consisting of latches 723 through 726 is parallel loaded from register A just before new data is loaded into register A. After a complete block has been received register B contains the first section of the block with register A containing the second section.

The address section of the block to be transmitted as loaded in the shift register at the same time the modifier section is loaded into the B register. During count thirteen (CT13) the contents of the B register is loaded into the shift register. During the receive mode a complete block of data is buffered in the data storage registers for subsequent gating to the computer.

Connection of a master station according to the present system to a communication link such as the telephone line, carrier trunk, etc. is accomplished through the line buffer and particularly by a two dimensional matrix (units bus and tens bus). The units bus consisting of busses designated Y0 through Y7 and the ten busses designated X0 through X3 and the line storage register are shown in FIG. 10 as a part of the line selection and storage circuit 600. The Y side of the matrix and the line switching speed circuit in the line storage is designated 1010. The X busses are developed through the latches 105 and 106. By operation of a relay at the juncture of an X and Y bus such as 1011, 1012, etc. a particular line selection relay is selected and will at its associated contacts such as 1181, 1182, 1184 and 1183 shown in FIG. 11 connect a line such as line one to the data set 750 shown in FIG. 7 and at the same time remove a line terminating network consisting of capacitor 1182 and 1184. Alternately should another line such as line X be selected a line selection relay such as 1019 might be operated and the line termination network would be removed from line X and line X in its turn would be connected to the data set 750.

Referring now to the data set two logical outputs are provided to the data set. The first data out derived from gate 764 is used to transfer data that is to be transmitted (logic 1=mark). The second "Transmit Mode," is used to switch the data set 750 into the transmit mode of operation. When in the receive mode the line buffer receives data via the "Data In" lead. Again a logic 1 indicates a MARK condition on the line.

The missed interrupt bit derived from latch 916 when set indicates to the computer that it must discard the block it just received. Once set this latch will remain set until the line buffer returns to the idle state. Subsequent blocks received in the same data stream after the setting of this latch must be discarded by the computer.

Upon completion of the pretransmission mark a delay (one clock pulse period) between the initiation of the start bit and the starting of the transmission clock must be developed. Absence of this delay will result in the shortening of the start bit by one count of the transmission clock counter. By action of latches 854 and 855 the necessary output will form the pre-transmission delay which is extended from gate 856 as the signal designated YP' and YS' to gate 761 of the data in and data out circuit 760.

DISPATCHER CONSOLE UPDATE CIRCUIT

Figure 12:
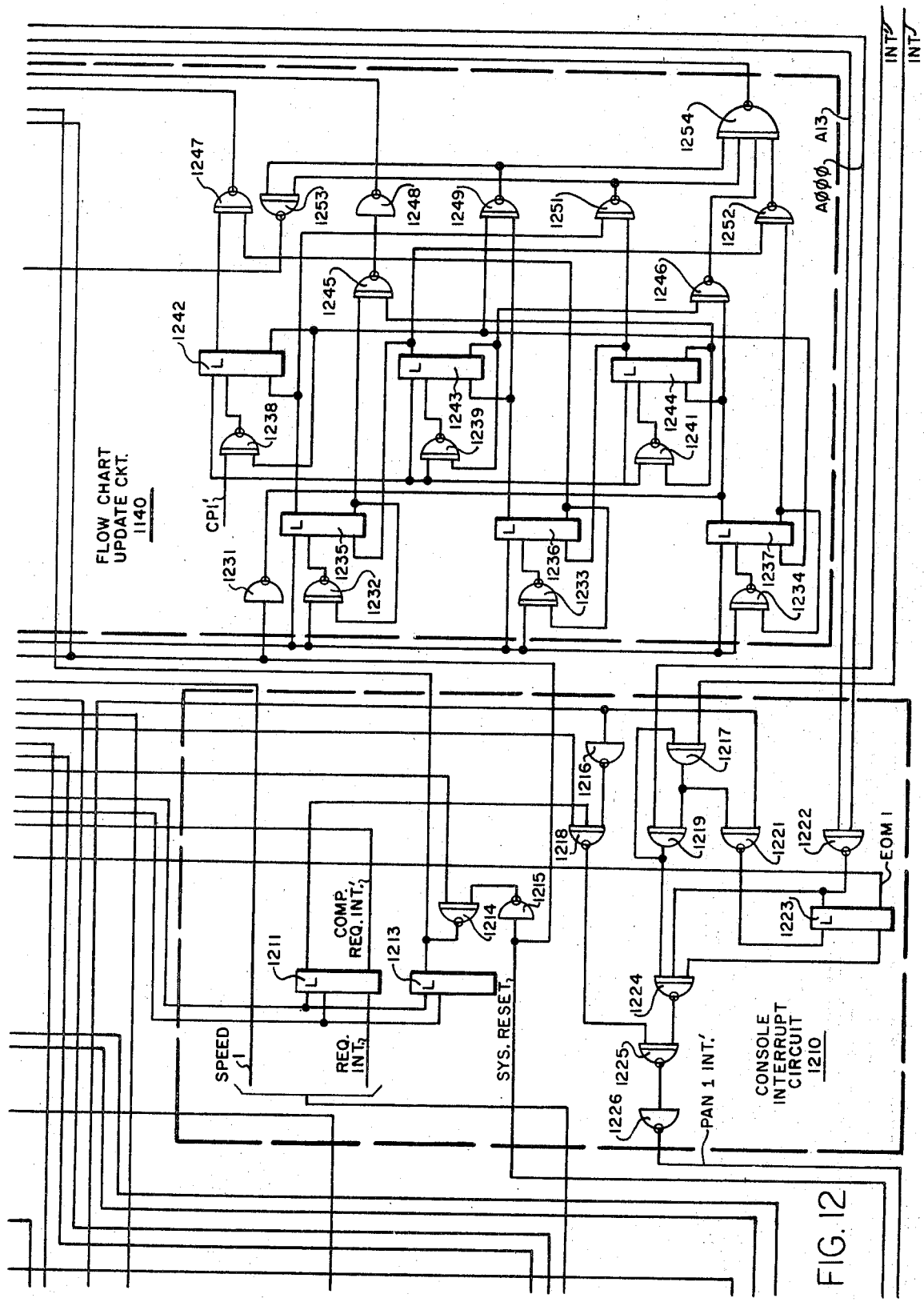
Figure 13:
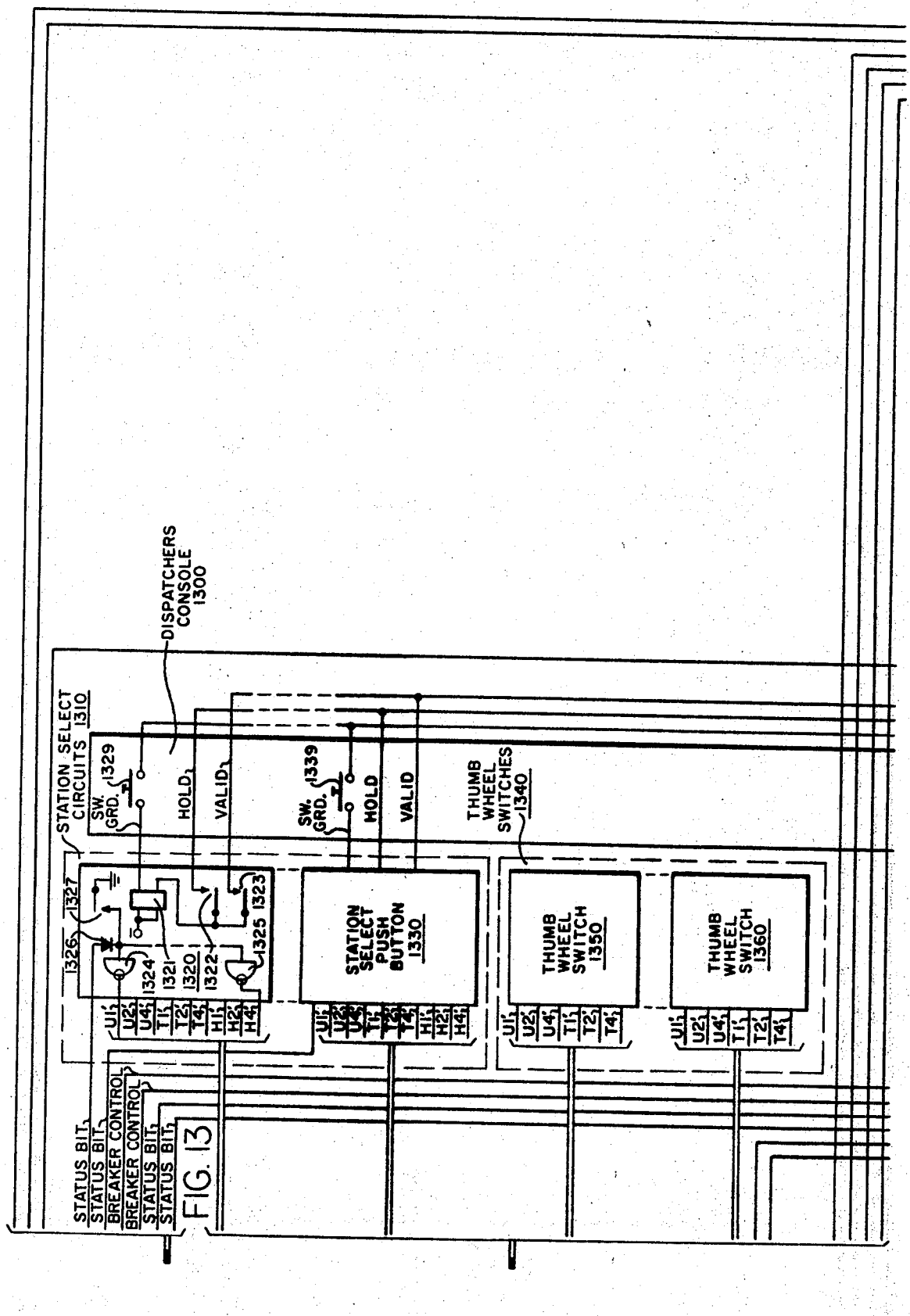
Figure 14:
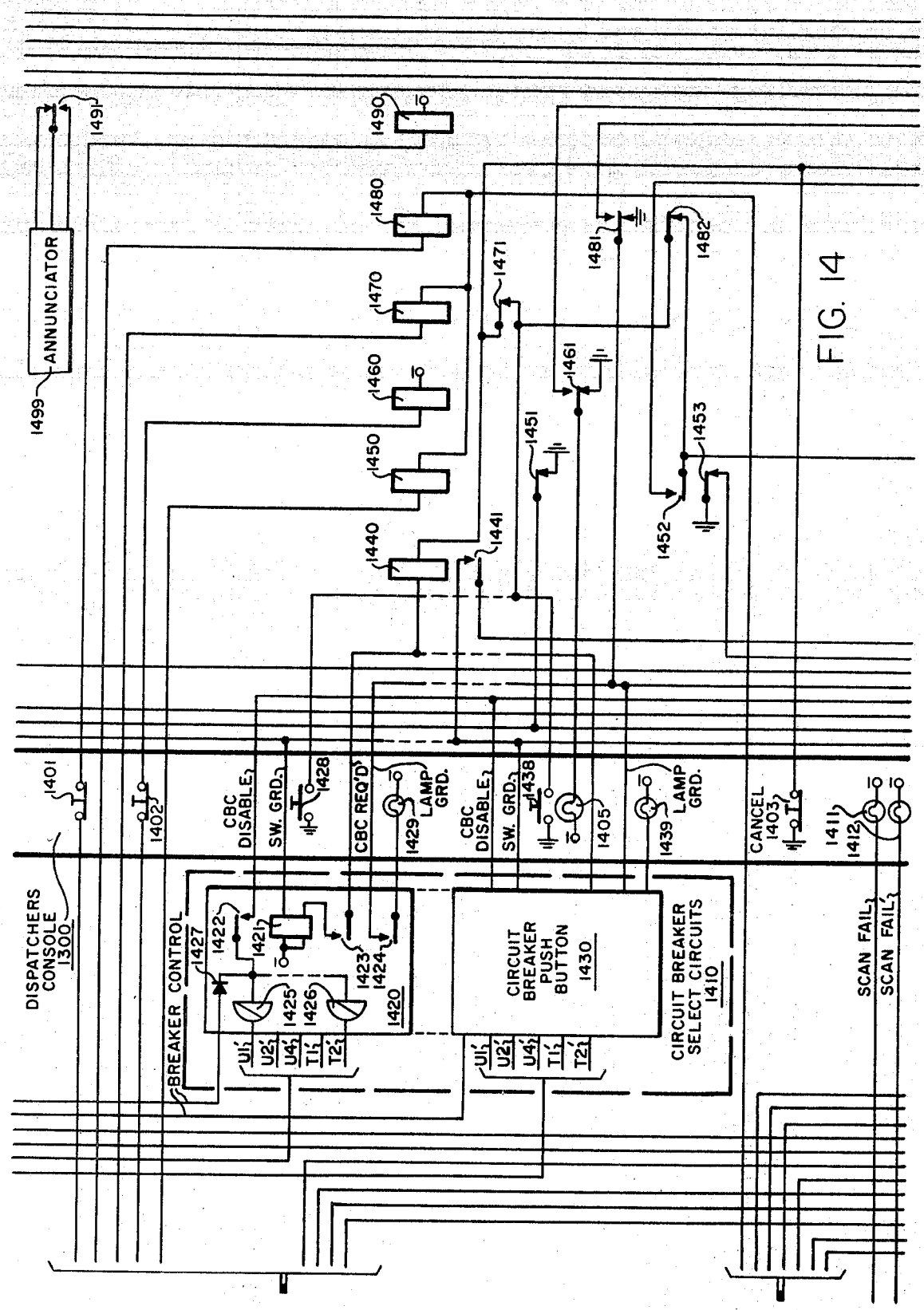
Figure 15:
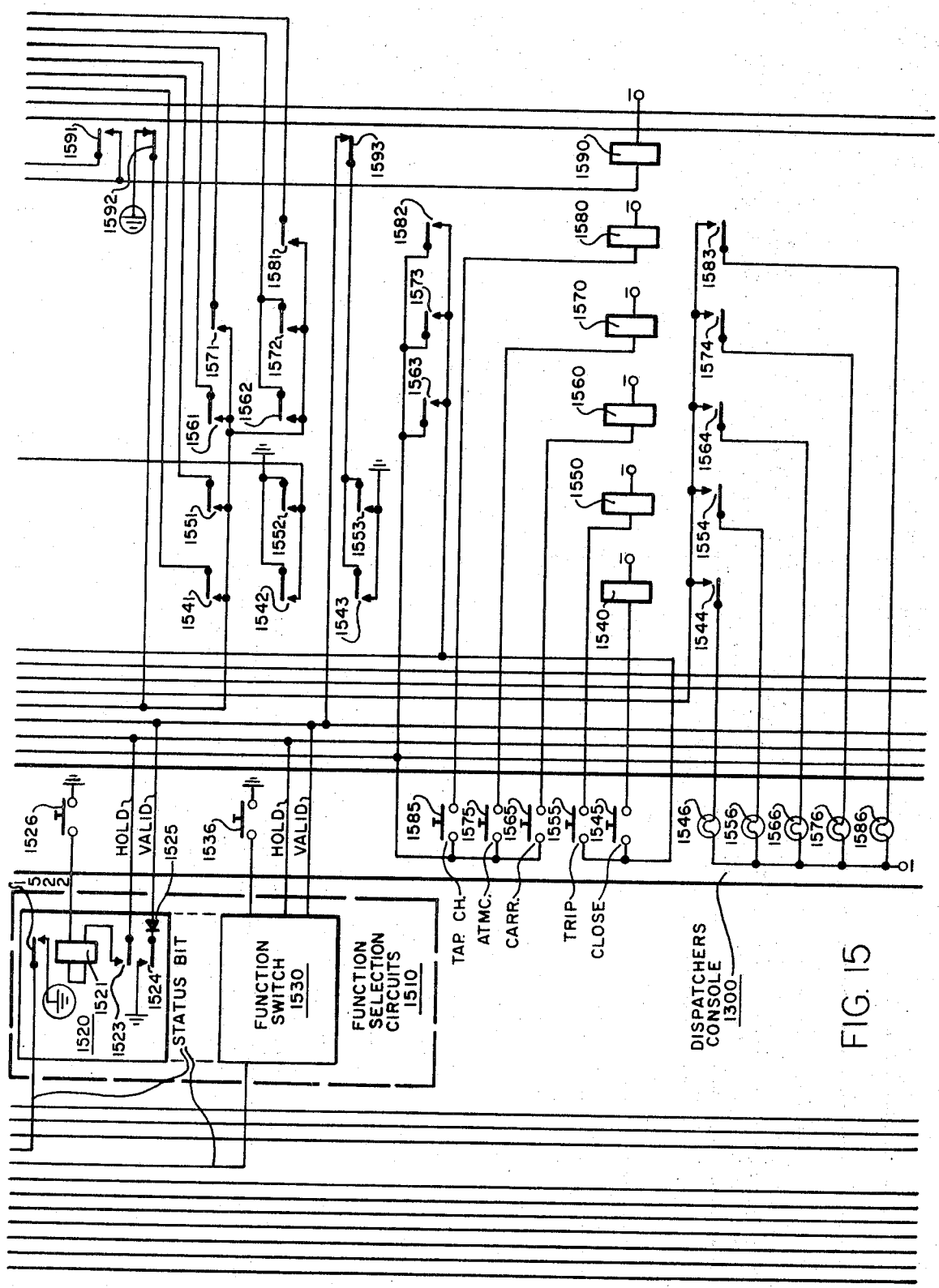
Figure 16:
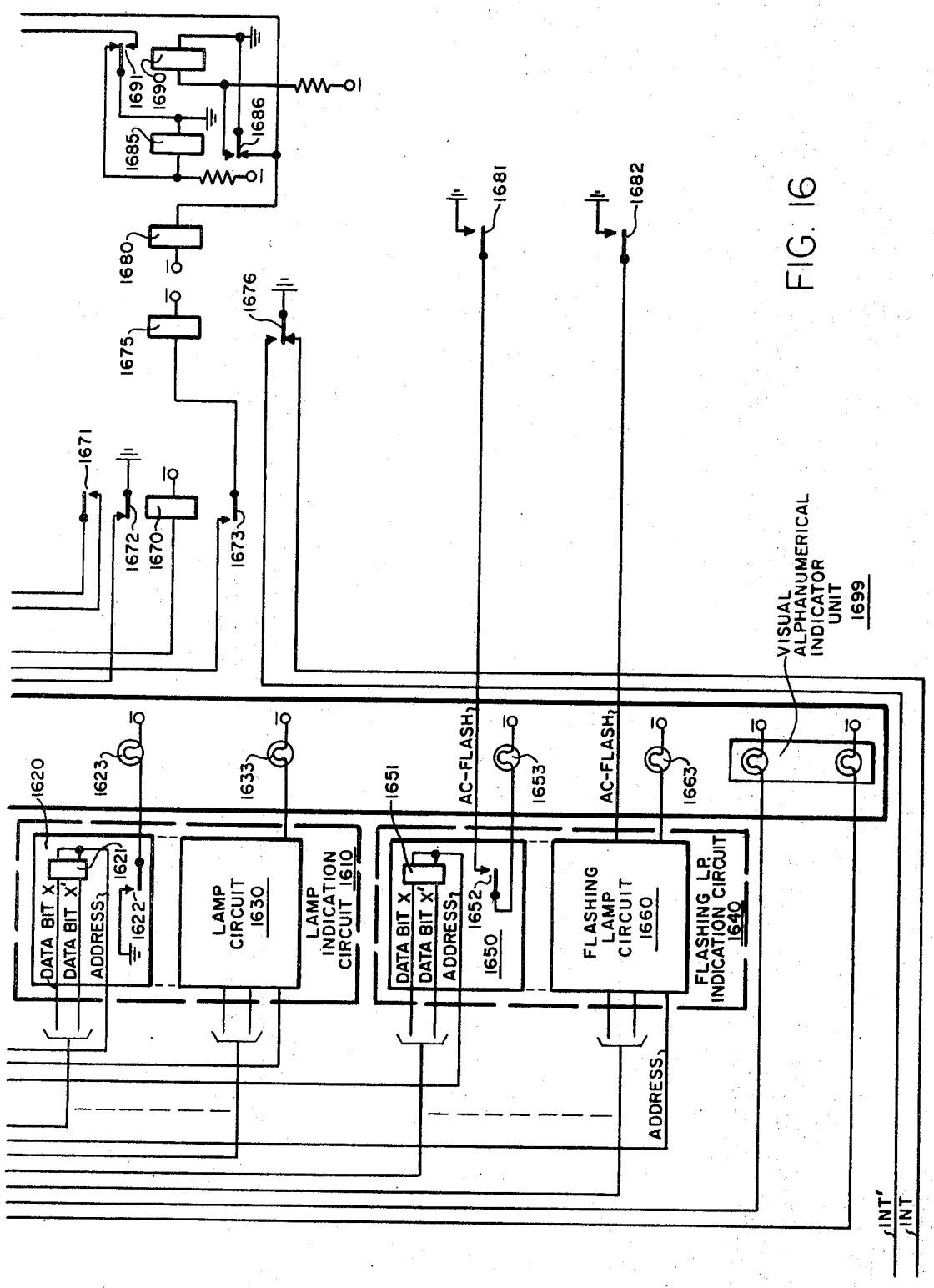

The dispatcher console update circuitry is shown in portions of FIGS. 9, 10, 11 and in FIG. 12. The console update circuit provides the control interface between the multiplexer and a dispatcher's console shown in FIGS. 13 to 16 inclusive, for updating visual and audible indications and gating dispatcher initiated control functions.

The console update circuit provides in the data register 1020 shown in FIG. 10 electronic storage for twenty-six bits identified as section A data bits and section B data bits. Thirteen data bits are available for each section.

The decoding device register 1030 provides electronic storage for eight bits which are utilized for deriving the console device addresses. These bits provide a two hundred fifty-six address capability. Two additional bits are also registered in the console update circuit. A speed instruction bit is stored in latch 1156 and a request interrupt bit in latch 1211.

Double rail output for all twenty-six data bits extends from the data register 1020 as bits A1 through A13, bit A1' through A13', bit B1 through B13 and B1' through B13'. Decoder 1031 shown as a portion of the decoding device register 1030 in FIG. 10 provides decoding for eight console device addresses. While not specifically shown additional decoders could be wired in parallel to provide additional decoder capability.

The data input circuit 950 provides gating for five 25-bit words in the word circuits 951 through 955 inclusive, under computer control for transmission to the computer.

Latch 1166 interprets either a "zero" or a "one" signal on its speed number 1 input as a computer selection of either of two update cycle speeds. The flow chart update circuit 1140 provides an update signal derived from the decoding of four out of six time states. Included in the flow chart update circuit 1140 is the timer 1155 which provides variable adjustment of the time states over two ranges depending upon the input signal. A first output in the range from one millisecond to four milliseconds may be achieved or in response to a second input signal a range from five milliseconds to forty milliseconds. The individual time within each range is determined on a preset basis.

The multiplexer accommodates computer request interrupts and dispatcher initiated interrupts in response to the presence of the appropriate signals from the console interrupt circuit 1210 and also by means of the scan failure circuit 1170 shown in FIG. 11 which provides a scanning indication implemented by the timer 1175 which is adjustable over a range of 1.2 second to 5.0 seconds.

The console update circuit like the multiplexer and line buffer utilizes logic wherein a logic "1" or TRUE is used as well as a complement logic "0" or FALSE. The dispatcher's console update circuit is prepared to accept data for an update sequence when the panel available lead extending from the upper output of latch 1054 is marked with a logic "1," indicating the previous update cycle has been completed.

Data appears and is stable on the inputs to the data register 1020, the decoding device register 1030 and latches 1156 and 1211, thirteen microseconds before and thirteen microseconds after the select device signal appears at gate 1021 shown in the data register 1020. The select device signal unique to the update circuit and a load signal which is common to all peripheral circuits are used to gate a CP1 pulse to the thirty-six latches involved which in combination will be referred to as the input register. Inversion by means of inverter 1022 in connection with the output of the signal of latch 1021 provide the proper load not and load signals for the latches. Data is then stored in the latches that comprise the input register and is available during the entire update sequence.

In addition to the latches in the input register, latch 1213 in the console interrupt circuit 1210 of FIG. 12 monitors the load pulse and is set to indicate that, in fact data was loaded. When latch 1213 is set an occurrence of the CP1 pulse sets the start latch 1141 shown in FIG. 11 as part of the flow chart update circuit 1140, a true output of the start latch will be inverted to place a logic "zero" on the ACK' lead. This will indicate to the multiplexer circuit that the update circuit has properly loaded data. The false or lower output of the start latch 1141 and a CP1 pulse are used to reset the enable sequence timer are used to reset latch 1054. The false output of latch 1054 is used to enable the sequence timer 1155. The true output is used to reset latch 1213 by placing a logic "zero" on its true output. Likewise the true output of 1155 is also used to reset the start latch 1141.

The sequence timer 1155 gates CP2 clock pulses at the end of selected time intervals to advance the flow chart update circuit 1140 to its next state. The length of the time interval selected is a function of the speed selection bit stored in the input register, the particular console device address and the state of the update flow chart. The selection of a fast update sequence (speed 1) enables timer range 1 independently of the state of the flow chart. Range 1 is adjustable from one to four milliseconds as previously noted. The selection of a slow update sequence speed 1' enables timer range 2 only if the sequence generator is in state 2 or state 3. Timer range 2 is also selected as a function of the particular console device address decoded. The particular address or addresses which require a slow update sequence are equipped with a diode to provide ground on the command not output at the time the address decode card is enabled. Timer range 2 is adjustable as previously noted from five to forty milliseconds.

To facilitate proper timer operation two latches 1163 and 1162 are sequenced through a reset routine at the end of each time interval. During the period that either one of the latches is set, the timer is disabled.

The flow chart update circuit 1140 consists of three primary latches 1237, 1236 and 1235 and three secondary latches 1244, 1243 and 1242 arranged to form a 2N counter. The CP2 pulse gated by the sequence timer 1155 is used to advance the primary latches to each succeeding state. The secondary latches follow the primary latches on CP1 pulses. Considering the primary latches only, the following states occur at each gated CP2 pulse from the timer:

|  | Latch 1237 | Latch 1236 | Latch 1235 |
|---|---|---|---|
| Idle State | 0 | 0 | 0 |
| After 1st CP2 | 1 | 0 | 0 |
| After 2nd CP2 | 1 | 1 | 0 |
| After 3rd CP2 | 1 | 1 | 1 |
| After 4th CP2 | 0 | 1 | 1 |
| After 5th CP2 | 0 | 0 | 1 |
| After 6th CP2 | 0 | 0 | 0 |

The outputs of the sequence generator latches are decoded by two levels of decoding. The first level providing six update decoding states is derived from the primary and secondary latches of the flow chart update circuit. The six sequence states are designated "S0" through "S5" and occur in order as a function of the flow chart update circuit. Consequently the length of each sequence state is dependent on the sequence timer interval. This is shown in the following table.

Sequence state:                                  Time interval
    S0 _____ Idle time + 1 to 4 ms.
    S1 _____ 1 to 4 ms.
    S2 _____ 1 to 4 ms. *or* 5 to 40 ms.
    S3 _____ 1 to 4 ms. *or* 5 to 40 ms.
    S4 _____ 1 to 4 ms.
    S5 _____ 1 to 4 ms.

The second level of decoding provides the enable 1 and enable 2 commands, with the enable 1 command being given in response to true conditions for state 1, state 2, and state 4. The enable 2 command is supplied in response to S2 and S3 states only.

The enable 1 command during speed 1 time interval is present for four to sixteen milliseconds or during a speed 1' interval of twelve to eighty-eight milliseconds. The enable 2 command or signal is present for two to eight milliseconds during a speed 1 interval and ten to eighty milliseconds during a speed 1 not interval Since each sequence state is decoded as a function of both the primary and secondary latches each sequence state overlaps the following sequence state. This assures that the enable signals are free from any momentary returns to ground during the time the particular signal is true.

The sequence timer 1155 is disabled at the end of an update sequence in the following manner. The enable sequence timer not' latch 1054 is set by pulse formed from the overlap of sequence states S0 and S5. A logic "one" from the false output of the start latch 1141 is on the data input of the latch 1054 at this time. At the same time that the sequence timer is disabled, the panel available lead extending from the true output of latch 1054 is marked with a logic "one."

The console interrupt circuit 1210 shown in FIG. 12 at inverter 1226 places a logic "zero" on the panel interrupt prime lead when there is either an interrupt requested by the computer or an interrupt initiated by the dispatcher. When the computer has requested an interrupt this provides an indication to the computer by way of gating in the multiplexer circuit that an update sequence has been completed. This indication occurs only if the computer requested interrupt bit is marked in the input register.

A dispatcher initiated interrupt is generated in response to a command from the console itself. The interrupt command results from the manual operation of the device on the console and is routed to the update circuit as a double rail signal over leads INT and INT'. The dispatcher initiated interrupt is removed from the update when the update circuit receives the first EOM command from the computer subsequent to the EOM commands from the computer, the computer by means of a normal update sequence will provide and acknowledge to the dispatcher initiated interrupt by loading the console device address 000 and marking bit B13. (Other data bits are also marked to release the proper relays in the console relay equipment.)

Latch 1223 in the console interrup circuit 1210 which stores the EOM1 command is also reset each time the console update circuit is selected, and a dispatcher initiated interrupt is not present. The scan failure circuit 1170 shown in FIG. 11 provides a timer 1175 which is reset each time an update sequence occurs or the address 000 is enabled and bit B13 is marked. Failure to reset the timer at prescribed intervals allows the timer to time out and set latch 1177 by means of the auxiliary pulse generated at the end of the time out intervals. This latch provides an indication of a malfunction. It is reset each time at reset command is given to the timer 1175.

The data input circuit 950 which provides update information to the computer has the capability of gating five 24-bit words to the computer. The two levels of gating are provided by data gates 956 and 957. Each of the word circuits 951 through 955 inclusive provides binary input to gate 1 of the five 25-bit words onto the 24-bit highway that extends through the multiplexer to the computer. A word is gated as a function of the particular EOM command received from the computer. EOM1 is used to gate word 1, EOM2 word 2 etc.

The console device address decoder 1031 is provided to decode the console device addresses appearing as binary coded digits in the decoding device register 1030. A particular address lead is marked with a logic "one" as a function of the code appearing on the 8-bit double rail highway extending from latches 1032 through 1034 inclusive, and an enable 1 command signal generated by the flow chart update circuit 1140. The decoder 1031 is equipped to decode addresses 000 through 007. The following table will show the code appearing on the true leads of the address highways and the address decoder. The complementary logic appears on the false leads.

| H2 | H1 | T4 | T2 | T1 | U4 | U2 | U1 | Address |
|----|----|----|----|----|----|----|----|---------|
| 0  | 0  | 0  | 0  | 0  | 0  | 0  | 0  | 000     |
| 0  | 0  | 0  | 0  | 0  | 0  | 0  | 1  | 001     |
| 0  | 0  | 0  | 0  | 0  | 0  | 1  | 0  | 002     |
| 0  | 0  | 0  | 0  | 0  | 0  | 1  | 1  | 003     |
| 0  | 0  | 0  | 0  | 0  | 1  | 0  | 0  | 004     |
| 0  | 0  | 0  | 0  | 0  | 1  | 0  | 1  | 005     |
| 0  | 0  | 0  | 0  | 0  | 1  | 1  | 0  | 006     |
| 0  | 0  | 0  | 0  | 0  | 1  | 1  | 1  | 007     |

When the console update circuit is to be reset, a reset command is developed as a function of the system reset or reset individual signals. The reset command is used to reset the following latches in the update circuit: latch 1213, latch 1141 and latch 1054 as well as the primary latches 1235, 1236 and 1237 of the flow chart update circuit 1140. The secondary latches 1242, 1243 and 1244 of the flow chart update circuit are reset on the CP1 pulse following the occurrence of the reset command to the primary latches.

CONSOLE EQUIPMENT

FIGS. 13, 14, 15 and 16 disclose the dispatcher's console 1300 and the associated console relay equipment. This equipment permits the generation of the necessary instructions for circuit breaker control, generation of an interrupt for any dispatcher initiated action and proper indication upon the successful completion of a control sequence. The relay circuitry provides an interlock to prevent the initiation of a control sequence before the previous sequence has been completed. It also provides a means of erasing a breaker selection should a mistake be made before the trip or close pushbutton has been depressed.

The console relay equipment also includes a free running pulser to provide a common flashing bus for lamps as well as an isolated circuit for actuating an alarm bell or chime.

Among other features the console relay equipment works in conjunction with the console update circuit previously described and with the dispatcher's console 1300 so that whenever any pushbutton other than a breaker select pushbutton is operated or when a breaker pushbutton is operated and a trip or close command is performed, relays 1670 and then 1675 will operate providing a valid signal for the relay equipment associated with the various pushbuttons of the console and providing the interrupt not signal over the appropriate bus to the console interrupt circuit 1210. The timing is such that the valid signal will arrive at the appropriate selection circuit to transmit binary information to the console update circuit before the interrupt or interrupt prime circuit arrives at the console interrupt circuit 1210. The timing is also such that all data associated with the dispatcher's interrupt will have been present at the console update circuit before the valid not signal arrives. When the computer services the interrupt, the console update circuit electronically removes the interrupt generated by relay 1675. However, the computer must acknowledge the dispatcher interrupt by causing relay 1450 to operate, thus removing the interrupt and restoring the relay circuit to its inoperative state.

When a control sequence is not accomplished the computer indicates this by causing relay 1480 to be operated flashing the lamps associated with the particular control function. The free running pulsing circuit consisting of relays 1685 and 1690 drives relay 1680 which provides a pulsating ground for flashing lamps.

The console relay equipment also includes two relays for alarms 1460 and 1490 each of which may be released by an associated switch button included in the dispatcher's console 1300. Operation of relay 1460 will cause alarm lamp 1403 to go from a steady to a flashing state. Operation of relay 1490 will cause an audible alarm such as annunciator 1499 to be operated by virtue of closure of contacts 1491.

The console relay equipment works in conjunction with the console itself 1300 disclosed throughout FIGS. 13, 14, 15 and 16 which contains the various pushbuttons and display lamps and indicators. The operation of the console can be divided into three categories, function, display and control. The function selection keys 1526 through 1536 which control the associated function selection circuits 1510 are utilized for controlling the operation of a visual display or logging equipment. By operation of a selected one of the function keys a status bit will be conducted to the data input circuit 950 but in turn will be capable of causing such functions as logging of the entire system, suspending of a logging operation, logging of a specific station, and stopping of logging operations completely. In response to operation of one of the function selection keys an associated lamp included in the lamp indication circuit group 1610 will be operated in response to the receipt of an appropriate data bit from the data bit register 1020. Other functions that can also be established by operation of one of the function selection keys are establishment of a high priority, low priority, reset and visual display cancellation.

Operation of key 1401 will silence the audible alarm by breaking the operating path to relay 1490. Operation of push key 1402 will stop the flashing of the annunciator lamp 1403 by restoring relay 1460.

The console visual display is made up of lamp circuits such as 1620 to 1630 which operate only in a steady manner, lamp circuits such as 1650 to 1660 which operate in a flashing manner and a group of visual numerical indicator devices such as "nixie" lamps or the like. Associated with each station select circuit such as those shown in 1310 is a lamp indicator that acts as a dedicated display. The other devices used for display are utilized on a time shared basis and are associated with a condition of circuit breakers or similar devices associated with a particular segment of the station selected and data contained in that segment.

Each station select pushbutton will have three lamps associated with it. The high priority alarm usually a red lamp, a low priority alarm, usually an amber lamp and a station segment lamp, usually white. The depression of the pushbutton will cause the computer to update the display with data from the selected segment. After updating is complete the station segment lamp will operate on a steady basis.

An unselected station segment lamp will flash when the reported status of a circuit breaker for instance is not the same as the previous status and a command or change status was not initiated by a dispatcher. If the station has more than one segment only the segment on which the breaker is displayed will flash. This flashing will stop when the station is selected for display or upon depression of the appropriate function switch to cause a station reset at which the lamp will turn on. An authorized change of the breaker being displayed will not result in the flashing of a station segment lamp.

The high-low priority lamps will flash when a change from no alarm to an alarm is detected in the field. The lamp will continue to flash until depression of the associated reset pushbutton. It will then remain steady until a no alarm condition is detected in the field. Upon receiving a no alarm indication the lamp will turn off. If the alarm indication goes away before acknowledged by the dispatcher the lamp will extinguish. High priority and low priority alarms are displayed only on the first segment of each station.

Associated with each circuit breaker selector circuit are alpha numeric character indicators which will indicate the identity of the breaker. In addition a pushbutton such as 1428 to control the selection, and three lamps typically a green lamp to indicate a tripped condition such as lamp 1556, a red lamp to indicate closed such as 1544, a white lamp such as 1429 to indicate selected for control. When a station selection is made, the circuit breaker status displays will light showing the current condition of the points and the given station. This updating occurs during the system scan.

A portion of the numerical indicators as well as the thumb wheel switches 1340, a portion of the function switches such as 1530 and the lamp circuit such as 1630 to 1660 may be dedicated for the use of point selection and point cancellation. This equipment will be dedicated as a function of the station selection pushbuttons. The thumb wheels are associated with each display to select the data point to be displayed on the visual indicators with the depression of the point selection pushbutton causing a single updating of its associated display. Data will be displayed until the new selection is made or the point cancellation pushbutton is operated. Lamp type indicators are utilized for displaying the position, direction or sign of the data point displayed.

All dispatcher requested control operations are of the two step type. The first step consisting of selecting the device which is to be controlled, such as a circuit breaker, and then selecting the function it is to perform such as trip or close. Control may be exercised on circuit breakers, tap changers and carrier relays (ATMC and CARR).

To operate a circuit breaker the dispatcher will first push a breaker select pushbutton such as 1428 which will cause the associated lamp such as 1429 to operate confirming the dispatcher's choice. The dispatcher may then depress either the trip activate pushbutton 1555 or the close activate pushbutton 1545. The associated lamp 1546 or 1556 would then also light indicating his choice. Should the control sequence be completed satisfactorily both indicators would then extinguish. Should the circuit breaker control sequence attempt be unsuccessful the trip or close lamp and the breaker select lamp will then go to a flashing state. This flashing condition may be extinguished by pressing the cancel selection pushbutton selected from the group of circuits 1510. This pushbutton would also be operated if the operator should select a breaker and then change his mind before actually initiating a control operation.

Thumb wheel switches from the group 1340 through 1350 and a selection pushbutton 1585 are associated with tap changer control. The station in which control is to take effect, is again a function of the station selection. To control a tap changer the dispatcher would select the particular changer by means of the thumb wheel switch, then push the selection pushbutton such as 1585 and then push a raise or lower pushbutton selected from the function switch group 1510. The remainder of the operation will be identical to circuit breaker control after the trip or close pushbutton is operated. The ATMC control (or carrier) is operationally similar to the circuit breaker controls. The station at which control takes place is that selected for display, and is a function of the station selection. The control and display will consist of two lamps selected from the group 1640 to indicate the field status (on or off) and a selection pushbutton such as 1575 and an associated selection lamp such as 1576. Operation is similar to that indicated for the circuit breakers. The cancel selection pushbutton a part of the group 1510 permits the operator to cancel a two step operation after the first stop has been completed before the function has been selected. It may also be used to stop the flashing of lamps subsequent to an unsuccessful control routine.

The system scan lamps 1411 and 1412 indicate whether or not the system is in the scan state. If the system is being scanned lamp 1412 will be operated if a scan failure occurs when the system is not being scanned lamp 1411 will light and lamp 1412 will be extinguished. Operation of lamp 1411 over the scan failure lead indicates the system is not being scanned as implied by the inability of the computer to periodically reset the scan failure circuit 1170 shown in FIG. 11.

Annunciator lamp 1405 is normally held operated over ground extended through contacts 1461. Whenever an alarm condition exists operation of relay 1460 will transfer the holding path at contact 1461 to the flasher circuit consisting of relays 1685 and 1690 causing lamp 1405 to flash. This flashing may be stopped by depression of the lamp reset pushbutton 1402. In addition alarm conditions will cause operation of relay 1490 which at its associated contacts 1491 will cause operation of audible alarm or annunciator 1499. To silence annunciator 1499 pushbutton 1401 will be operated breaking the holding path for relay 1490.

The station select, breaker select and digital display select and cancel and the function pushbuttons all utilize the same technique for identifying which type was pushed and generating the appropriate code to be transmitted to the computer. Utilizing the station select circuit 1320 as an example, the pushbutton such as 1329 is pressed and relay 1321 would be operated locking to a holding path at its contact 1322 that extends back to ground at contact 1451 of relay 1450. Contacts such as 1326 place ground on the encoding busses which are strapped to give the particular coded identity of the device selected or to be operated. In the case of the station select pushbutton operation of relay 1326 will close the hold path previously outlined and generates a 9-bit identifying code marking a bit in the status word to be read by the computer and at the same time by operation of relay 1670 causing operation of relay 1675 to extend and interrupt signal to the console update circuit. The hold path will be broken when the computer acknowledges the interrupt. At that time the message returned from the computer and stored in the data register 1020 will be extended by way of appropriate code leads to the acknowledge relay 1450 causing it to operate and removing the holding ground.

When a breaker control pushbutton such as 1428 is operated, the associated relay 1421 will operate closing the holding path through to relay 1440.

When relay 1440 operates this conditions relays 1450 the close relay and relay 1550 the trip relay for operation in response to operation of the trip or close pushbutton. Operation of breaker control relay 1421 also closes a path to the associated selection indicator lamp such as 1429 causing it to be lighted. Here the hold path will be broken when the computer completes the control routine satisfactorily or when the cancel selection pushbutton is pressed after an unsuccesful control routine.

When one of the function pushbuttons such as 1526 is operated an associated relay such as 1521 will operate likewise locking the holding path at its contact 1523 and at contact 1522 marking a particular bit in the status word to be read by the computer. Likewise extension of ground at contact 1524 over the valid lead will result in operation of relay 1675 and generation of contact 1676 of an interrupt signal for transmission to the computer. Again the hold path will be broken when the computer acknowledges the interrupt signal.

The individual lamps such as 1623, 1633, 1653 and 1663 are lighted by operation of their association relays such as 1621, etc. These relays are of the two winding magnetically latching type and will latch in the operated position in receipt of one data bit such as a data bit X and release in response to another bit such as data bit X'.

The alpha numeric visual indicator unit 1699 requires a thirteen bit data input received from the decoder 1031 in which each input will control one cathode or input in a "nixie" tube or similar indicating device. Similarly the inverted output signal will act as an erase to an operated indicator.

What is claimed is:

1. A supervisory and control system comprising, in combination, a master station, a plurality of remote stations, a plurality of communication links each connecting at least one of said remote stations to said master station, a plurality of equipment monitors and a plurality of equipment controllers at each of said remote stations, and said master station including; line selection means including circuit connections to each of said communication links; a data set connected to said line selection means; a digital processor operated in accordance with a first program to periodically generate equipment monitor addresses; data control means connected to said digital processor operated in response to the generation of an equipment monitor address to store said address; data conversion means connected between said data set and said data control means and further including circuit connections to said line selection means, operated in response to said address stored in said data control means to operate said line selection means to connect said data set to a selected one of said communication links, said data conversion means further operated to convert said equipment monitor address stored in said data control means into a status request message and control said data set to transmit said status request message over said selected communication link to at least one of said equipment monitors.

2. A supervisory and control system as claimed in claim 1, wherein said equipment monitor address generated by said digital processor in accordance with said first program includes information representative of the identity of at least one equipment monitor, and the identity of the communication link associated with the remote station at which said equipment monitor is located; and wherein said data control means include an instruction register operated to store said equipment monitor addresses; and wherein said data conversion means include a shift register operated to convert said monitor address stored in said instruction register into a serially transmitted status request message.

3. A supervisory and control system as claimed in claim 1, wherein said equipment monitor addresses generated by said digital processor each include information representative of the speed of transmission to be utilized in transmitting information to said equipment monitor; and said data conversion means include speed control means operated in accordance with said information to control the rate of transmission of said status request message.

4. A supervisory and control system as claimed in claim 1, wherein said equipment monitor addresses generated by said digital processor includes information representative of the length of reply to be generated by said equipment monitor in response to said status message; and said data conversion means further include message registration means operated in accordance with said reply length information to store said information pending receipt of a message in reply to said status request message.

5. A supervisory and control system as claimed in claim 1, wherein said remote station operated in response to the receipt of a status request message to transmit a status reply message representative of the status of at least one of said equipment monitors to said master station over said communication link, and wherein said data conversion means operated in response to the receipt of a status reply message to operate said data control means to transfer said status reply message to said digital processor.

6. A supervisory and control system as claimed in claim 5, wherein said data conversion means further include message registration means storing information representative of the length of an expected status reply message operated in response to the receipt of said status reply message to tabulate said status reply message length and transmit an error indicating signal to said digital processor in response to a status reply message length different from said stored information.

7. A supervisory and control system as claimed in claim 5, wherein said data control means further include status sensing means; and said data conversion means include interrupt signal generating means operated in response to the receipt of a status reply message to generate a signal for interruption of said digital processor; said status sensing means operated in response to the generation of said interrupt signal to present said interrupt signal to said digital processor.

8. A supervisory and control system as claimed in claim 5, wherein said data conversion means further include: shift register means connected between said data set and said data control means; and register control means operated in response to the receipt of a status reply message to control said shift register to convert said status reply message from serial form to parallel form and transfer said parallel signals to said data control means.

9. A supervisory and control system as claimed in claim 5, wherein said master station further includes a dispatcher's console including a plurality of indicating means; console interface means connected between said dispatcher's console and said data control means; said digital processor operated in response to receipt of said status reply message to generate an equipment monitor status indicating message; said data control means operated in response to generation of said status indicating message to transfer said message to said console interface means; said console interface means operated in response to the receipt of said message to select one of said indicating means at said dispatcher's concole and operate said selected indicating means in accordance with said status indicating message.

10. A supervisory and control system as claimed in claim 9, wherein said indicating means include a plurality of visual indicators.

11. A supervisory and control system as claimed in claim 9, wherein said indicating means include an audible signaling device.

12. A supervisory and control system as claimed in claim 9, wherein said data control means include an instruction register operated in response to said digital processor generated status indicating message to store said message.

13. A supervisory and control system as claimed in claim 12, wherein said console interface means include a decoder connected to said data control means operated in response to said status indicating message stored in said data control means to select one of said indicating means at said dispatcher's console.

14. A supervisory and control system as claimed in claim 13, wherein said console interface means include data registration means connected to said data control means, operated in response to said status indicating message stored in said data control means to extend a signal representative of the status of an equipment monitor at said remote station, to said dispatcher's console to operate said selected indicating means.

15. A supervisory and control system as claimed in claim 1, wherein said dispatcher's console further includes control selection means operated to generate a control request message; said console interface means operated in response to said control request selection to store said selection; and said data control means operated in response to operation of said console interface means to transmit said control request message from said console interface circuit to said digital processor.

16. A supervisory and control system as claimed in claim 15, wherein said console interface means include means for generating an interrupt signal in response to the intiation of said control request at said dispatcher's console, and transmitting said interrupt signal to said data control means, said data control means further including status sensing means operated in response to said interrupt signal to transmit said interrupt signal to said digital processor.

17. A supervisory and control system as claimed in claim 15, wherein said console interface means include encoding means operated in response to the initiation of a control request by said dispatcher's console to generate a message representative of said control request for transmission to said digital processor.

18. A supervisory and control system as claimed in claim 15, wherein said control selection means include means operated for selection of a remote station at which a selected equipment controller is located.

19. A supervisory and control system as claimed in claim 15, wherein said control selection means include means for selecting a desired one of said equipment controllers at a selected remote station.

20. A supervisory and control system as claimed in claim 15, wherein said control selection means include means for selecting a desired mode of operation for a selected equipment controller located at a selected remote station.

21. A supervisory and control system as claimed in claim 15, wherein said control selection means include means for selecting a desired one of said equipment controllers at a selected remote station and for selecting the desired mode of operation for said selected controller.

22. A supervisory and control system as claimed in claim 15, wherein said digital processor further operated in response to receipt of a control request message from said data control means, generated by said control request selection means at said dispatcher's console, to operate in accordance with a second program to generate an equipment controller command message.

23. A supervisory and control system as claimed in claim 22, wherein said data control means further operated in response to the generation of an equipment controller command message to store said message; said data conversion means further operated in response to said equipment controller command message stored in said data control means to operate said line selection means to connect said data set to a selected one of said communication links, said data conversion means further operated to convert said equipment controller command message stored in said data control means into a control command message and control said data set to transmit said command message over said selected communication link to at least one of said equipment controllers.

24. A supervisory and control system as claimed in claim 22, wherein said equipment controller command message generated by said digital processor in accordance with said second program includes information representative of the identity of at least one equipment controller, and the identity of the communication link associated with the remote station at which said equipment controller is located; and wherein said data control means include an instruction register operated to store said equipment controller command message; and wherein said data conversion means include a shift register operated to convert said controller command message stored in said instruction register into a serially transmitted control command message.

25. A supervisory and control system as claimed in claim 22, wherein said control command message generated by said digital processor includes information representative of the speed of transmission to be utilized in transmitting information to said equipment controller; and said data conversion means include speed control means operated in accordance with said information to control the rate of transmission of said control command message.

References Cited

UNITED STATES PATENTS 3,349,374 10/1967 Gabrielson et al. _____ 340—163
3,444,520 5/1969 Messersmith et al. ____ 340—163

THOMAS A. ROBINSON, Primary Examiner

U.S. Cl. X.R.

178—3

PO-1050
(5/69)

UNITED STATES PATENT OFFICE
CERTIFICATE OF CORRECTION

Patent No. 3,529,293          Dated Sept. 15, 1970

Inventor(s) Joseph F. Sullivan, Ronald E. Schauer, Richard P. Sanders, Bruno A. Mattedi and Neil B. Johnson It is certified that error appears in the above-identified patent and that said Letters Patent are hereby corrected as shown below:

Column 3, line 53, change "ar" to --are--;
Column 3, line 59, change "respeat" to --repeat--;
Column 3, line 74, change "complete" to --completely--.

Column 4, line 31, change "formed" to --format--.

Column 5, line 14, change "fautly" to --faulty--;
Column 5, line 47, change "circiutry" to --circuitry--;
Column 5, line 50, change "perfornmed" to --performed--.

Column 6, line 36, change "too" to --to--;
Column 6, line 37, change "secuirty" to --security--.

Column 7, line 69, change "mising" to --missing--.

Column 8, line 62, change "digit" to --digits-- .

Column 10, line 56, change "multpilexer" to --multiplexer--.

Column 14, line 50, change "Logis" to --Logic--.

Column 16, line 24, change "as" to --is--.

Column 19, line 1, after "state 2," insert --state 3,--;
Column 19, line 48, change "interrup" to --interrupt--.

Column 23, line 43, change "1450" to --1540--.

Claims:
Column 25, line 27, (cl. 9), change "concole" to --console--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents